(12) United States Patent
Dudar

(10) Patent No.: US 11,651,631 B2
(45) Date of Patent: May 16, 2023

(54) METHODS AND SYSTEMS FOR DIAGNOSING DEGRADATION IN PRESSURELESS FUEL TANK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 233 days.

(21) Appl. No.: 17/222,595

(22) Filed: Apr. 5, 2021

(65) Prior Publication Data
US 2022/0319254 A1 Oct. 6, 2022

(51) Int. Cl.
| | |
|---|---|
| *G07C 5/08* | (2006.01) |
| *B60K 15/035* | (2006.01) |
| *B60K 6/22* | (2007.10) |
| *B01D 53/04* | (2006.01) |
| *B60K 15/03* | (2006.01) |

(52) U.S. Cl.
CPC ....... *G07C 5/0808* (2013.01); *B01D 53/0415* (2013.01); *B01D 53/0454* (2013.01); *B60K 6/22* (2013.01); *B60K 15/035* (2013.01); *B60K 15/03519* (2013.01); *G07C 5/0816* (2013.01); *B01D 2259/4516* (2013.01); *B60K 2015/03217* (2013.01); *B60K 2015/03243* (2013.01); *B60Y 2200/92* (2013.01); *B60Y 2400/303* (2013.01); *B60Y 2400/3019* (2013.01)

(58) Field of Classification Search
CPC ................ G07C 5/0808; G07C 5/0816; B01D 53/0415; B01D 53/0454; B01D 2259/4516; B60K 6/22; B60K 15/03519; B60K 15/035; B60K 2015/03217; B60K 2015/03243
USPC .......................................... 701/29.4
See application file for complete search history.

(56) References Cited

U.S. PATENT DOCUMENTS

| | | | |
|---|---|---|---|
| 3,693,825 A | 9/1972 | Richman | |
| 4,880,135 A * | 11/1989 | Neou | B65D 90/38 220/721 |
| 6,382,453 B1 * | 5/2002 | Miura | B60K 15/03 220/722 |
| 6,681,789 B1 | 1/2004 | Moulis et al. | |
| 8,074,627 B2 | 12/2011 | Siddiqui | |
| 9,284,924 B2 | 3/2016 | Dudar et al. | |

(Continued)

FOREIGN PATENT DOCUMENTS

JP 3790017 B2 6/2006

*Primary Examiner* — Mahmoud Gimie
(74) *Attorney, Agent, or Firm* — Vincent Mastrogiacomo; McCoy Russell LLP

(57) ABSTRACT

Methods and systems are provided for diagnosing leaks/degradation in a fuel system. In one example, a system for a vehicle may comprise a variable volume device disposed within a fuel tank; an atmospheric port of the variable volume device fluidly coupled to a vent line upstream of a hydrocarbon sensor housed in the vent line, the vent line coupling a fuel vapor canister to atmosphere; and a controller storing instructions for monitoring output of the hydrocarbon sensor; and generating an indication of a degradation in the variable volume device based on the monitored hydrocarbon sensor. In this way, it is possible to effectively detect a degradation/leak in the variable volume device with minimal specialized components in the fuel system.

20 Claims, 8 Drawing Sheets

(56) References Cited

U.S. PATENT DOCUMENTS

| | | |
|---|---|---|
| 9,664,127 B2 | 5/2017 | Dudar |
| 9,751,396 B2 | 9/2017 | Dudar |
| 10,006,413 B2 | 6/2018 | Dudar et al. |
| 10,100,771 B2 | 10/2018 | Dudar |
| 10,151,265 B2 | 12/2018 | Dudar |
| 10,364,763 B2 | 7/2019 | Dudar |
| 10,451,010 B2 | 10/2019 | Dudar |
| 2004/0250795 A1 | 12/2004 | Stroia et al. |
| 2011/0139130 A1* | 6/2011 | Siddiqui ............ F02M 25/0818 123/520 |
| 2016/0298576 A1 | 10/2016 | Reddy et al. |
| 2019/0249622 A1 | 8/2019 | Dudar et al. |

* cited by examiner

METHODS AND SYSTEMS FOR DIAGNOSING DEGRADATION IN PRESSURELESS FUEL TANK

FIELD

The present description relates generally to methods and systems for diagnosing degradation in a fuel system, and particularly for detecting leaks in a fuel tank and/or bellows included therein.

BACKGROUND/SUMMARY

Vehicles, such as plug-in hybrid electric vehicles (PHEVs), may include a fuel system in which a fuel tank may be fluidically coupled to a fuel vapor canister for storing, filtering, and venting fuel vapors from the fuel tank. The fuel tank may be isolatable from the fuel vapor canister via a fuel tank isolation valve (FTIV) such that only fuel vapors from select events may be present in a given volume (e.g., the fuel tank or the fuel vapor canister). For example, the fuel tank may trap diurnal fuel vapors (that is, from diurnal temperature cycles) and "running loss" fuel vapors (that is, from fuel vaporized during vehicle operation), and the fuel vapor canister may adsorb depressurization fuel vapors (that is, fuel vapors depressurized from the fuel tank to prevent overpressure) and refueling fuel vapors (that is, fuel vapors diverted during refilling of the fuel tank). Further, when a pressure gradient is generated due to a relatively low pressure in either an intake manifold of the vehicle or the fuel tank, fuel vapors may be passively purged from the fuel vapor canister.

Such fuel systems are sometimes referred to as non-integrated refueling canister-only systems (NIRCOSs). To control the various venting and flow paths for the fuel vapors during different modes of vehicle operation, actuation of complex valve and locking systems (including the FTIV) may be enabled such that no single volume in the NIRCOS is overwhelmed with excess fuel vapor pressure and that any such excess fuel vapor pressure is released. To ensure component reliability in extreme fuel vapor pressure scenarios (e.g., excess fuel vapor pressure or excess vacuum), components of the fuel system may be specially reinforced. For example, the fuel tank may be constructed from heavy steel and may include a number of standoffs supporting opposing walls of the fuel tank. To further mitigate component degradation, depressurization or venting of the fuel tank and/or the fuel vapor canister may be executed on a timescale ranging from a few seconds to a few minutes (e.g., depending on ambient conditions).

However, particularly lengthy depressurization/venting may result in operator frustration or confusion, as the excess fuel vapor pressure needs to be evacuated prior to opening a refueling inlet to the atmosphere. Additionally, the extra hardware used to seal and depressurize the fuel tank adds cost to the system. One approach to reducing the depressurization time and cost is to use a sealed but "pressure-less" fuel tank with a built-in variable volume device (e.g., a bellows) that expands and contracts to relieve vacuum and pressure buildups, thereby eliminating pressurization hardware and reducing costs as shown in U.S. Pat. Nos. 6,681,789; 3,693,825; and J.P. Patent No. 3,790,017.

However, the inventors herein have recognized potential issues with such systems. For instance, as the bellows vents via an atmospheric port, a degradation in the bellows may result in undetected increased evaporative emissions. In one example, the issues described above may be addressed by a system for a vehicle, comprising a variable volume device disposed within a fuel tank; an atmospheric port of the variable volume device fluidly coupled to a vent line upstream of a hydrocarbon sensor housed in the vent line, the vent line coupling a fuel vapor canister to atmosphere; and a controller storing instructions for monitoring output of the hydrocarbon sensor; and generating an indication of a degradation in the variable volume device based on the monitored hydrocarbon sensor. In this way, it is possible to effectively detect a degradation/leak in the bellows without installing additional specialized components beyond what is already provided in the vehicle.

In another approach, the issues described above may be addressed by a diagnostic method for a vehicle, comprising: monitoring a level of fuel in a fuel tank, the fuel tank including a bellows internal to the fuel tank, an atmospheric port of the bellows coupled to a vent line via a vapor line; isolating a refueling canister fluidly coupled to the fuel tank from a hydrocarbon sensor positioned in a vent line coupling the refueling canister to atmosphere by closing a changeover valve; activating a fuel pump positioned in the fuel tank to generate fuel vapors; and monitoring output of a hydrocarbon sensor coupled to the vent line to identify a degradation in the bellows. In this way, a diagnostic routine for degradation/leaks in bellows may be provided that will meet current and future degradation detection regulations, thereby facilitating a transition from higher-cost pressurized fuel tank systems to less costly pressure-less fuel tank systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
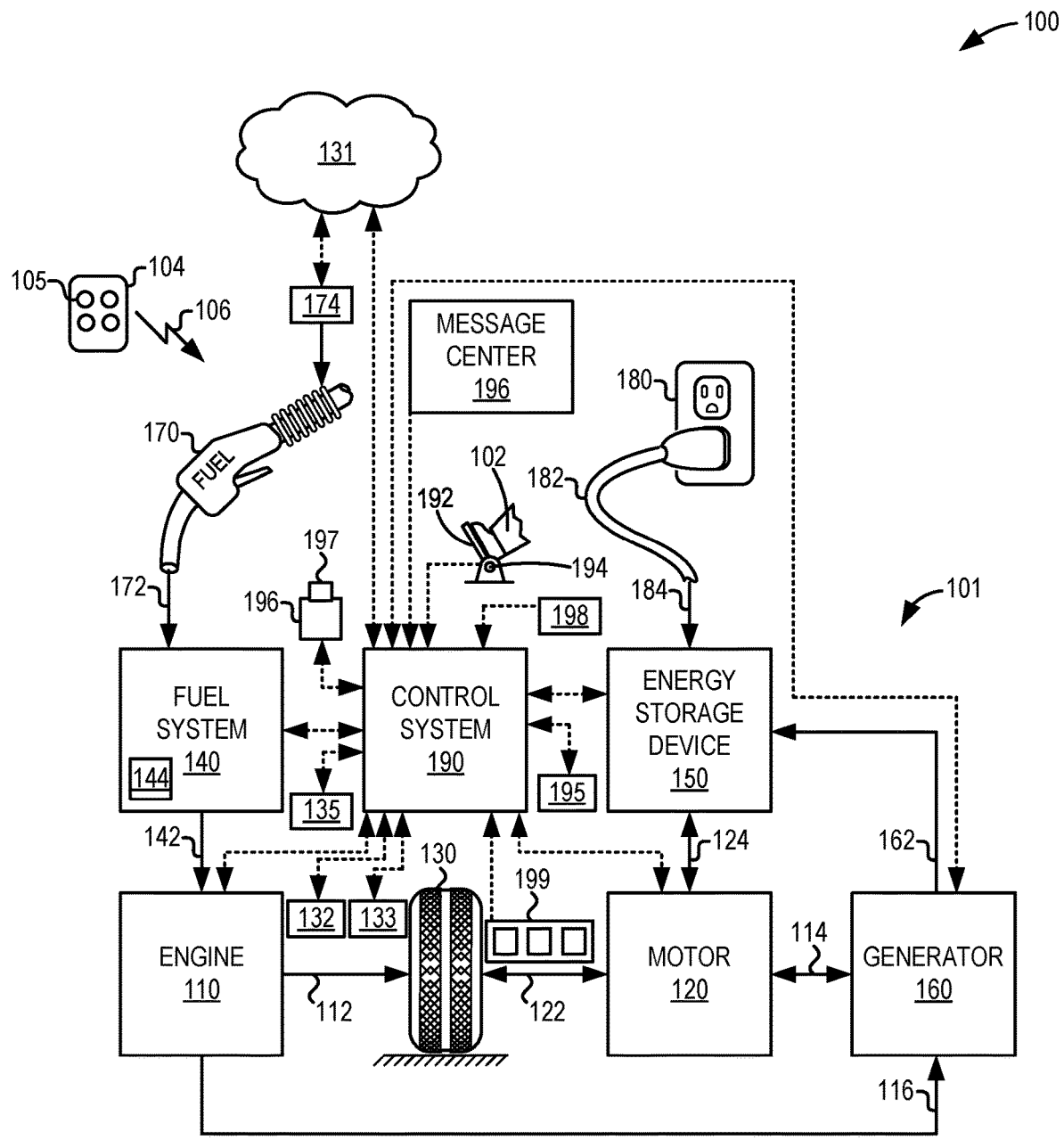
FIG. 1 shows a high-level block diagram illustrating an example vehicle system.
Figure 2:
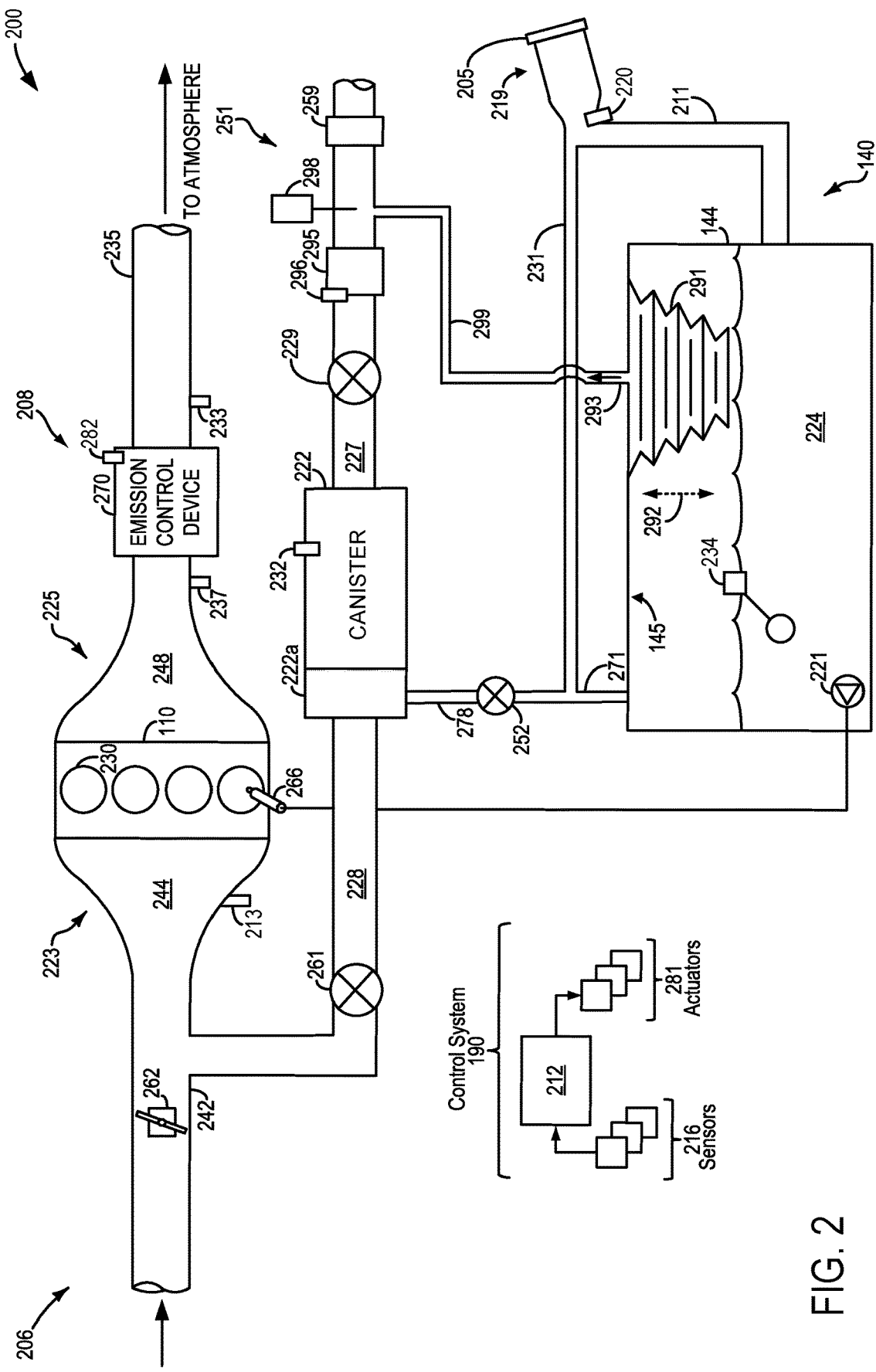
FIG. 2 shows a schematic diagram of a portion of the example vehicle system of FIG. 1, the portion of the example vehicle system including a fuel system and an evaporative emissions control system.

The following description relates to methods and systems for diagnosing degradation of components of a fuel system coupled to an engine, such as the fuel system and the engine included in the vehicle system of FIGS. 1 and 2. A control routine may be implemented by a controller included in the vehicle system, the controller configured to notify a vehicle operator of a degraded fuel system and adjust one or more engine operating parameters to mitigate deleterious effects of the degraded fuel system. The controller may also be configured to notify a vehicle operator of a degradation in an evaporative emissions control system. As one example, the control routine may include a method depicted in FIG. 3 for diagnosing a leak in a fuel vapor canister of the evaporative emissions control system. As another example, the control routine may include methods depicted in FIGS. 5-7 for diagnosing a leak in a variable volume device included in a fuel tank of the fuel system. The diagnosis may be performed by monitoring a hydrocarbon sensor located in the evaporative emissions control system, wherein the hydrocarbon sensor may be fluidly coupled to an atmospheric port of the variable volume device of the fuel system. The diagnostic methods for the variable volume device depicted in FIGS. 5-7 may be active or passive. The entry conditions for each of the active diagnostic method and the passive diagnostic method are depicted in FIGS. 4A and 4B, respectively. Further, FIG. 8 provides a graphical display of an exemplary engine operating sequence to illustrate fuel tank fuel level and valve adjustments in greater detail. In this way, pressure-less fuel tanks used in hybrid vehicles may be maintained in full compliance with emissions regulations and degradations in a variable volume device of a fuel tank may be identified rapidly and efficiently.

Referring now to FIG. 1, a high-level block diagram 100 depicting an example vehicle propulsion system 101 is shown. Vehicle propulsion system 101 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. In such an example, a vehicle with vehicle propulsion system 101 may be referred to as a hybrid electric vehicle (HEV).

Vehicle propulsion system 101 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via one or more drive wheels 130 (as indicated by an arrow 122) while engine 110 is deactivated.

During other operating conditions, engine 110 may be set to a deactivated state (as described above) while motor 120 may be operated to charge an energy storage device 150. For example, motor 120 may receive wheel torque from drive wheel(s) 130 (as indicated by arrow 122), where the motor may convert the kinetic energy of the vehicle to electrical energy for storage at an energy storage device 150 (as indicated by an arrow 124). This operation may be referred to as regenerative braking of the vehicle. Thus, motor 120 can provide a generator function in some examples. However, in other examples, a generator 160 may instead receive wheel torque from drive wheel(s) 130, where the generator may convert the kinetic energy of the vehicle to electrical energy for storage at energy storage device 150 (as indicated by an arrow 162).

During still other operating conditions, engine 110 may be operated by combusting fuel received from a fuel system 140 (as indicated by an arrow 142). For example, engine 110 may be operated to propel the vehicle via drive wheel(s) 130 (as indicated by an arrow 112) while motor 120 is deactivated. During other operating conditions, both engine 110 and motor 120 may each be operated to propel the vehicle via drive wheel(s) 130 (as indicated by arrows 112 and 122, respectively). A configuration where both engine 110 and motor 120 may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 101 may be configured as a series type vehicle propulsion system, whereby engine 110 does not directly propel drive wheel(s) 130. Rather, engine 110 may be operated to power motor 120, which may in turn propel the vehicle via drive wheel(s) 130 (as indicated by arrow 122). For example, during select operating conditions, engine 110 may drive generator 160 (as indicated by an arrow 116), which may in turn supply electrical energy to one or more of motor 120 (as indicated by an arrow 114) and energy storage device 150 (as indicated by arrow 162). As another example, engine 110 may be operated to drive motor 120 which may in turn provide a generator function to convert engine output to electrical energy, where the electrical energy may be stored at energy storage device 150 for later use by motor 120.

Fuel system 140 may include one or more fuel tanks 144 for storing fuel onboard the vehicle. For example, fuel tank 144 may store one or more liquid fuels, including but not limited to gasoline, diesel, and alcohol fuels. In some examples, the fuel may be stored onboard the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 (as indicated by arrow 142). Still other suitable fuels or fuel blends may be supplied to engine 110, where they may be combusted at engine 110 to produce the engine output. The engine output may be utilized to propel the vehicle (e.g., via drive wheel(s) 130, as indicated by arrow 112) or to recharge energy storage device 150 via motor 120 or generator 160.

In some examples, energy storage device 150 may be configured to store electrical energy that may be supplied to other electrical loads residing onboard the vehicle (other than motor 120), including cabin heating and air conditioning, engine starting, headlights, cabin audio and video systems, etc. As a non-limiting example, energy storage device 150 may include one or more batteries and/or capacitors.

A control system 190 may communicate at least with one or more of engine 110, motor 120, fuel system 140, energy storage device 150, and generator 160. Specifically, control system 190 may receive sensory feedback information at least from one or more of engine 110, motor 120, fuel system 140, energy storage device 150, and generator 160. Further, control system 190 may send control signals at least to one or more of engine 110, motor 120, fuel system 140, energy storage device 150, and generator 160 responsive to the sensory feedback information. Control system 190 may receive an indication of an operator requested output of vehicle propulsion system 101 from a vehicle operator 102. For example, control system 190 may receive sensory feedback from a pedal position sensor 194 which communicates with a pedal 192. Pedal 192 may refer schematically to a brake pedal and/or an accelerator pedal. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or smartphone based system where a cellular telephone or smartphone (e.g., operated by vehicle operator 102) may send data to a server and the server may communicate with the vehicle (e.g., via a wireless network 131) to start engine 110.

Energy storage device 150 may periodically receive electrical energy from a power source 180 residing external to the vehicle, e.g., not part of the vehicle (as indicated by an arrow 184). As a non-limiting example, vehicle propulsion system 101 may be configured as a plug-in HEV (PHEV), whereby electrical energy may be supplied to energy storage device 150 from power source 180 via an electrical energy transmission cable 182. During a recharging operation of energy storage device 150 from power source 180, electrical energy transmission cable 182 may electrically couple energy storage device 150 to power source 180. When vehicle propulsion system 101 is subsequently operated to propel the vehicle, electrical energy transmission cable 182 may be disconnected between power source 180 and energy storage device 150. Control system 190 may identify and/or control an amount of electrical energy stored at energy storage device 150, which may be referred to as a state of charge (SOC).

In other examples, electrical energy transmission cable 182 may be omitted, and electrical energy may instead be received wirelessly at energy storage device 150 from power source 180. For example, energy storage device 150 may receive electrical energy from power source 180 via one or more of electromagnetic induction, radio waves, and electromagnetic resonance. More broadly, any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle (e.g., during a refueling event). As a non-limiting example, vehicle propulsion system 101 may be refueled by receiving fuel via a fuel dispensing device 170 (as indicated by an arrow 172), the fuel dispensing device being supplied with fuel by an external fuel pump 174. In some examples, fuel tank 144 may be configured to store the fuel received from fuel dispensing device 170 until the fuel is supplied to engine 110 for combustion. In some examples, control system 190 may receive an indication of a level of the fuel stored at fuel tank 144 (also referred to herein as the fuel level or fill level of fuel tank 144) via a fuel level sensor. The level of fuel stored at fuel tank 144 (e.g., as identified by the fuel level sensor) may be communicated to vehicle operator 102, for example, via a fuel gauge or indication in a vehicle instrument panel 196. In additional or alternative examples, control system 190 may be coupled to external fuel pump 174 via wireless network 131 (e.g., in a "smart" fuel pump configuration). In such examples, control system 190 may receive (e.g., via wireless network 131) signals indicative of an amount of fuel dispensed, a rate of fueling (e.g., during the refueling event), a distance of the vehicle from external fuel pump 174, an amount of money or credit available to vehicle operator 102 with which to purchase fuel at external fuel pump 174, etc. Accordingly, an expected level of fuel (e.g., a level of fuel expected assuming undegraded fuel system components) may be determined by control system 190 based on the signal received from external fuel pump 174. In some examples, the vehicle instrument panel 196 may include a refueling button which may be manually actuated or pressed by a vehicle operator to initiate refueling. For example, in response to the vehicle operator actuating the refueling button, fuel tank 144 in the vehicle may be depressurized so that refueling may be performed.

Vehicle propulsion system 101 may also include an ambient temperature/humidity sensor 198, and a roll stability control sensor, such as a lateral and/or longitudinal and/or yaw rate sensor(s) 199. As shown, sensors 198, 199 may be communicably coupled to control system 190, such that the control system may receive signals from the respective sensors. Vehicle instrument panel 196 may include indicator light(s) and/or a text-based display in which messages are displayed to vehicle operator 102 (e.g., such as an indication of a degradation status of a vehicle component generated by a diagnostic control routine). Vehicle instrument panel 196 may also include various input portions 197 for receiving an operator input, such as depressible buttons, touch screens, voice input/recognition, etc.

In some examples, vehicle propulsion system 101 may include one or more onboard cameras 135. Onboard camera(s) 135 may communicate photo and/or video imaging data to control system 190, for example. Onboard camera(s) 135 may in some examples be utilized to record images within a predetermined radius of the vehicle, for example. As such, control system 190 may employ signals (e.g., imaging data) received by onboard camera(s) 135 to detect and identify objects and locations external to the vehicle.

In additional or alternative examples, vehicle instrument panel 196 may communicate audio messages to vehicle operator 102 in combination with, or entirely without, visual display. Further, sensor(s) 199 may include a vertical accelerometer to indicate road roughness, the vertical accelerometer being communicably coupled to control system 190, for example. As such, control system 190 may adjust engine output and/or wheel brakes to increase vehicle stability in response to signals received from sensor(s) 199.

Control system 190 may be communicably coupled to other vehicles or infrastructures using appropriate communications technology. For example, control system 190 may be coupled to other vehicles or infrastructures via wireless network 131, which may comprise Wi-Fi, Bluetooth®, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles may either be direct between vehicles, or multi-hop. In some examples, longer range communications (e.g., WiMax) may be used in place of, or in conjunction with, V2V or V2I2V to extend coverage area on an order of a few miles. In still other examples, control system 190 may be communicably coupled to other vehicles or infrastructures via wireless network 131 and the Internet (e.g., cloud). In further examples, wireless network 131 may be a plurality of wireless networks 131 across which data may be communicated to vehicle propulsion system 101.

Vehicle propulsion system 101 may also include an onboard navigation system 132 (for example, a global positioning system, or GPS) with which vehicle operator 102 may interact. Onboard navigation system 132 may include one or more location sensors for assisting in estimating vehicle speed, vehicle altitude, vehicle position/location, etc. Such information may be used to infer engine operating parameters, such as local barometric pressure. As discussed above, control system 190 may be configured to receive information via the Internet or other communication networks. Accordingly, information received at control system 190 from onboard navigation system 132 may be cross-referenced to information available via the Internet to determine local weather conditions, local vehicle regulations, etc. In some examples, vehicle propulsion system 101 may include laser sensors (e.g., lidar sensors), radar sensors, sonar sensors, and/or acoustic sensors 133, which may enable vehicle location information, traffic information, etc., to be collected via the vehicle.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 101 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control system 251 and fuel system 140. Engine system 208 may include engine 110 having a plurality of cylinders 230. Engine 110 may include an engine air intake system 223 and an engine exhaust system 225. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an emission control device 270, which in one example may be mounted in a close-coupled position in exhaust passage 235 (e.g., closer to engine 110 than an outlet of exhaust passage 235) and may include one or more exhaust catalysts. For instance, emission control device 270 may include one or more of a three-way catalyst, a lean nitrogen oxide ($NO_x$) trap, a diesel particulate filter, an oxidation catalyst, etc. In some examples, an electric heater 282 may be coupled to emission control device 270, and utilized to heat emission control device 270 to or beyond a predetermined temperature (e.g., a light-off temperature of emission control device 270).

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure.

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to evaporative emissions control system 251 via vapor recovery line 231, before being purged to engine air intake system 223. Vapor recovery line 231 may be coupled to fuel tank 144 via one or more conduits. For example, vapor recovery line 231 may be coupled to fuel tank 144 via at least one conduit 271.

Evaporative emissions control system 251 may further include one or more fuel vapor containers or canisters 222 for capturing and storing fuel vapors. Fuel vapor canister 222 may be coupled to fuel tank 144 via at least one conduit 278 including at least one fuel tank isolation valve (FTIV) 252 for isolating the fuel tank during certain conditions. For example, during engine operation, FTIV 252 may be kept closed to limit the amount of diurnal or "running loss" vapors directed to canister 222 from fuel tank 144. During refueling operations and selected purging conditions, FTIV 252 may be temporarily opened, e.g., for a duration, to direct fuel vapors from the fuel tank 144 to canister 222. Further, FTIV 252 may also be temporarily opened when the fuel tank pressure is higher than a threshold (e.g., above a mechanical pressure limit of the fuel tank), such that fuel vapors may be released into the canister 222 and the fuel tank pressure is maintained below the threshold.

In some examples, vapor recovery line 231 may be coupled to a fuel tank refilling or refueling system 219. In some examples, refueling system 219 may include a fuel cap 205 for sealing off the refueling system from the atmosphere. Refueling system 219 may be coupled to fuel tank 144 via a fuel filler pipe or neck 211. In some examples, fuel filler pipe 211 may include a flow meter sensor 220 operable to monitor a flow of fuel being supplied to fuel tank 144 via the fuel filler pipe (e.g., during refueling).

During refueling, fuel cap 205 may be manually opened or may be automatically opened responsive to a refueling request received at controller 212. A fuel dispensing device (e.g., 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

Evaporative emissions control system 251 may include one or more emissions control devices, such as fuel vapor canister 222 filled with an appropriate adsorbent, the fuel vapor canister being configured to temporarily trap fuel vapors (including vaporized hydrocarbons) during refueling operations. In one example, the adsorbent used may be activated charcoal. Evaporative emissions control system 251 may further include a canister ventilation path or vent line 227 which may route gases out of fuel vapor canister 222 to the atmosphere when storing, or trapping, fuel vapors from fuel system 140.

Fuel vapor canister 222 may include a buffer 222a (or buffer region), each of the fuel vapor canister and the buffer including the adsorbent. As shown, a volume of buffer 222a may be smaller than (e.g., a fraction of) a volume of fuel vapor canister 222. The adsorbent in buffer 222a may be the same as, or different from, the adsorbent in fuel vapor canister 222 (e.g., both may include charcoal). Buffer 222a may be positioned within fuel vapor canister 222 such that, during canister loading, fuel tank vapors may first be adsorbed within the buffer, and then when the buffer is saturated, further fuel tank vapors may be adsorbed in a remaining volume of the fuel vapor canister. In comparison, during purging of fuel vapor canister 222, fuel vapors may first be desorbed from the fuel vapor canister (e.g., to a threshold amount) before being desorbed from buffer 222a. In other words, loading and unloading of buffer 222a may not be linear with loading and unloading of fuel vapor canister 222. As such, one effect of buffer 222a is to dampen any fuel vapor spikes flowing from fuel tank 144 to fuel vapor canister 222, thereby reducing a possibility of any fuel vapor spikes going to engine 110.

In some examples, one or more temperature sensors 232 may be coupled to and/or within fuel vapor canister 222. As fuel vapor is adsorbed by the adsorbent in fuel vapor canister 222, heat may be generated (heat of adsorption) Likewise, as fuel vapor is desorbed by the adsorbent in fuel vapor canister 222, heat may be consumed. In this way, the adsorption and desorption of fuel vapor by fuel vapor canister 222 may be monitored and estimated based on temperature changes within the fuel vapor canister.

Vent line 227 may also allow fresh air to be drawn into fuel vapor canister 222 when purging stored fuel vapors from fuel system 140 to engine air intake system 223 via purge line 228 and purge valve 261. For example, purge valve 261 may normally be closed but may be opened during certain conditions so that vacuum from engine intake manifold 244 may be provided to fuel vapor canister 222 for purging. In some examples, vent line 227 may further include an air filter 259 disposed therein downstream of fuel vapor canister 222.

Flow of air and vapors between fuel vapor canister 222 and the atmosphere may be regulated by a canister vent valve 229. Canister vent valve 229 may be a normally open valve, so that FTIV 252 may control venting of fuel tank 144 with the atmosphere. As described above, FTIV 252 may be positioned between fuel tank 144 and fuel vapor canister 222 within conduit 278. FTIV 252 may be a normally closed valve, that when opened, allows for venting of fuel vapors from fuel tank 144 to fuel vapor canister 222. Fuel vapors may then be vented to atmosphere via canister vent valve 229, or purged to engine air intake system 223 via canister purge valve 261.

In some examples, evaporative emissions control system 251 may further include an evaporative level check monitor (ELCM) 295. ELCM 295 may be disposed in vent line 227 and may be configured to control venting and/or assist in detection of undesired evaporative emissions. As an example, ELCM 295 may include a vacuum pump for applying negative pressure to the fuel system when administering a test for undesired evaporative emissions. In some embodiments, the vacuum pump may be configured to be reversible. In other words, the vacuum pump may be configured to apply either a negative pressure or a positive pressure on the evaporative emissions control system 251 and fuel system 140. ELCM 295 may further include a reference orifice (not shown), a pressure sensor (not shown), and a changeover valve (COV) 296. A reference check may thus be performed whereby a vacuum may be drawn across the reference orifice, where the resulting vacuum level comprises a vacuum level indicative of an absence of undesired evaporative emissions. For example, following the reference check, the fuel system 140 and evaporative emissions control system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

During select engine and/or vehicle operating conditions, such as after an emission control device light-off temperature has been attained (e.g., a threshold temperature reached after warming up from ambient temperature) and with the engine running, the controller 212 may control the ELCM 295 changeover valve (COV) 296 to enable fuel vapor canister 222 to be fluidically coupled to atmosphere. For example, ELCM COV 296 may be configured in a first position (e.g. opened), where the first position includes the fuel vapor canister 222 fluidically coupled to atmosphere, except during pressure tests performed on the system. In one example, under natural aspiration conditions (e.g. intake manifold vacuum conditions), ELCM COV 296 may be configured in a second position (e.g. closed) to seal the fuel vapor canister 222 from atmosphere. By commanding ELCM COV 296 to the second position, the evaporative emissions control system 251 and fuel system 140 may be evacuated in order to ascertain the presence or absence of undesired evaporative emissions.

A hydrocarbon (HC) sensor 298 may be present in evaporative emissions control system 251 to indicate the concentration of hydrocarbons in vent line 227. As illustrated, hydrocarbon sensor 298 is positioned between fuel vapor canister 222 and air filter 259. A probe (e.g., sensing element) of hydrocarbon sensor 298 is exposed to and senses the hydrocarbon concentration of fluid flow in vent line 227. Hydrocarbon sensor 298 may be used by the control system 190 for determining breakthrough of hydrocarbon vapors from fuel vapor canister 222, in one example.

Fuel system 140 may be a non-integrated refueling canister-only system (NIRCOS), in that fuel tank 144 may be substantially isolatable from fuel vapor canister 222 such that fuel vapors in fuel tank 144 and fuel vapor canister 222 may be independently controlled as desired (e.g., during refueling). During periods in which fuel tank 144 is fluidically decoupled from fuel vapor canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

As an alternative, fuel system 140 may include a bellows 291 to maintain a fuel vapor pressure of fuel tank 144 at, or near, atmospheric pressure. As such, complex structural configurations for managing excess fuel vapor pressure may be obviated. Specifically, bellows 291 may be disposed within and affixed to an upper surface 145 of fuel tank 144 having an atmospheric port 293.

As shown in FIG. 2, the fuel level of fuel 224 in fuel tank 144 may be entirely below bellows 291, such that the (liquid) fuel may not be physically contacting the bellows and the bellows may be in a maximally expanded configuration. As the bellows 291 is contacted by rising fuel 224 during refueling, the bellows may compress along an axis 292 proportionally with an increase in the fuel level in fuel tank 144 (up until the bellows reaches a maximally compressed configuration). During compression, air within bellows 291 may be evacuated via the atmospheric port 293. After refueling and during engine operation, fuel 224 may be provided to engine 110 via actuation of fuel pump system 221, such that the fuel level in fuel tank 144 may fall and bellows 291 may expand proportionally along axis 292 (up until the bellows again attains the maximally expanded configuration). During expansion, a pressure differential may be generated between bellows 291 and the surrounding environment such that air may be induced into the bellows via the atmospheric port 293.

In this way, a variable volume configuration may be provided to fuel tank 144 via expansion and contraction of bellows 291, such that a fuel vapor pressure of the fuel tank may be maintained within a threshold range of a predetermined pressure (e.g., an ambient pressure of the surrounding environment). In some examples, the fuel vapor pressure of fuel tank 144 may be maintained within the threshold range even across widely varying ambient temperatures, such as between 40 and 95° F. As such, fuel tank 144 may be formed from materials having relatively weaker strength and including fewer or no standoffs therein. Further, a more simplified configuration of valves and lines may be included in fuel system 140 relative to other NIRCOSs, as complex depressurization/venting routines may be obviated by the presence of bellows 291.

The atmospheric port 293 of the bellows 291 may be routed to the vent line 227 proximal to the hydrocarbon sensor 298 of the evaporative emissions control system 251 via a vapor line 299. In the illustrated example, a first end of the vapor line 299 is attached to the atmospheric port 293 of the bellows 291 and a second end of the vapor line 299 is attached to the HC sensor 298 in the vent line 227. This establishes a fluidic communication between the bellows 291 of the fuel tank 144 and the HC sensor 298. Thus, it ensures any fuel vapors escaping from the bellows 291 (e.g., due to degradation/leak in the bellows) via the vapor line 299 may be detected by the HC sensor 298 of the evaporative emissions control system 251.

Therefore, the hydrocarbon sensor 298 of the evaporative emissions control system 251 may perform two different functions. The HC sensor 298 may detect fuel vapors escaping from the fuel vapor canister 222 to atmosphere, if there is a leak or degradation in the canister. In addition, the HC sensor 298 may also detect fuel vapors escaping from the bellows 291 of the fuel tank 144 via the atmospheric port 293, if there is a leak or degradation in the bellows. More details will be presented below and in subsequent figures as to how the system distinguishes between fuel vapors escaping from the canister and the bellows.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252, allowing bellows 291 to maintain the fuel vapor pressure of fuel tank 144 within the threshold range of the predetermined pressure. However, if bellows 291 is compressed to the maximally compressed configuration, and the fuel vapor pressure begins increasing beyond that is manageable by fuel tank 144 (e.g., when the fuel tank becomes undesirably overfilled), fuel system 140 may be operated in a venting mode. In the venting mode, controller 212 may open FTIV 252 and canister vent valve 229, while maintaining canister purge valve 261 closed, to direct refueling vapors into fuel vapor canister 222 while preventing fuel vapors from being directed into engine intake manifold 244 (and thus provide a venting path for fuel vapors). As such, opening FTIV 252 may allow refueling vapors to be stored in fuel vapor canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open canister purge valve 261 and canister vent valve 229 while closing FTIV 252. Herein, the vacuum generated by engine intake manifold 244 of (operating) engine 110 may be used to draw fresh air through vent line 227 and through fuel vapor canister 222 to purge stored fuel vapors into engine intake manifold 244. As such, in the canister purging mode, the purged fuel vapors from fuel vapor canister 222 may be combusted in engine 110. The canister purging mode may be continued until an amount or level of stored fuel vapors in fuel vapor canister 222 are below a threshold amount or level.

As another example, the fuel system may be operated during a diagnostics test of a component of the fuel tank 144 (e.g., bellows 291) at engine off event, wherein the controller 212 may isolate the fuel vapor canister 222 from the HC sensor 298 by closing the ELCM COV 296 or the canister vent valve 229 of the evaporative emissions control system 251. Herein, the vapors generated in the fuel tank 144 may be routed directly to the HC sensor 298 via the atmospheric port 293, if a leak or degradation is present in bellows 291 which may allow fuel or fuel vapor from the tank to enter the bellows. The leak may be localized to a specific region of the bellows (e.g., a side or a base of the bellows). Following the diagnosis, the vehicle operator may be notified with specific maintenance instructions and/or one or more engine operating parameters may be altered to mitigate degradation to vehicle performance and component reliability.

Control system 190, including controller 212, is shown receiving information from a plurality of sensors 216 (various examples of which are described herein) and sending control signals to a plurality of actuators 281 (various examples of which are described herein). As one example, sensors 216 may include one or more of exhaust gas sensor 237 located upstream of emission control device 270 in exhaust passage 235, temperature sensor 233 located downstream of emission control device 270 in exhaust passage 235, flow meter sensor 220 located in fuel filler pipe 211, fuel level sensor 234 located in fuel tank 144, temperature sensor 232 located in fuel vapor canister 222, and hydrocarbon sensor 298 located in vent line 227. Other sensors such as pressure, temperature, air/fuel ratio, and composition sensors may be coupled to various locations in vehicle system 206 (for example, a fuel tank pressure sensor may further be included in fuel tank 144). As an additional or alternative example, actuators 281 may include fuel injector 266, throttle 262, FTIV 252, canister purge valve 261, canister vent valve 229, and ELCM COV 296. Controller 212 may receive input data from sensors 216, process the input data, and trigger actuators 281 in response to the processed input data based on instructions or code programmed in non-transitory memory therein, the instructions or code corresponding to one or more control routines. For example, during a vehicle off condition or during a refueling event, control system 190 may be configured to monitor a fuel level of fuel tank 144 and the amount of fuel supplied to the fuel tank.

A plurality of control routines for diagnosing degradation to the fuel system 140 and entry conditions for the respective diagnostic tests are described in detail below with reference to FIGS. 4A-6. In the present disclosure, two different diagnostic methods have been illustrated for diagnosing a degradation or leak in the bellows 291 of the fuel tank 144 under different vehicle conditions. The first exemplary method includes an active diagnostic test, while the second exemplary method includes a passive diagnostic test.

As will be described in more details with reference to FIG. 5, the active diagnostic test actively detects a degradation or leak in the bellows 291 of the fuel tank 144 via isolating the fuel vapor canister 222 from the hydrocarbon sensor 298 by adjusting the ELCM changeover valve 296 to a closed position. This ensures that the HC sensor 298 is responsive to the bellows 291 only when the fuel pump 221 is activated to generate fuel vapors. The active diagnostic test may be performed during a vehicle-off condition. As will be described in more details with reference to FIGS. 6-7, the passive diagnostic test passively detects a leak or degradation in the bellows 291 either during a refueling event or during a vehicle drive event by monitoring the HC sensor 298 while the fuel level goes above a maximum expansion level of the bellows 291. The entry conditions for the active diagnostic test and the entry conditions for the passive diagnostic test are presented in more details in FIGS. 4A and 4B, respectively.

Since the HC sensor 298, according to the present disclosure, is capable of detecting fuel vapors escaping from both the fuel vapor canister 222 of the evaporative emissions control system 251 and the bellows 291 of the fuel system 140, possible leaks in the fuel vapor canister 222 should be tested prior to testing for leaks in the bellows 291. This step is carried out to ensure that there are no hydrocarbons already present in the vent line 227 from a canister leakage prior to conducting the diagnostic tests of the bellows 291. A detailed method for sensing fuel vapors vented from the fuel vapor canister 222 to atmosphere via the HC sensor 298 is presented in FIG. 3.

Figure 3:
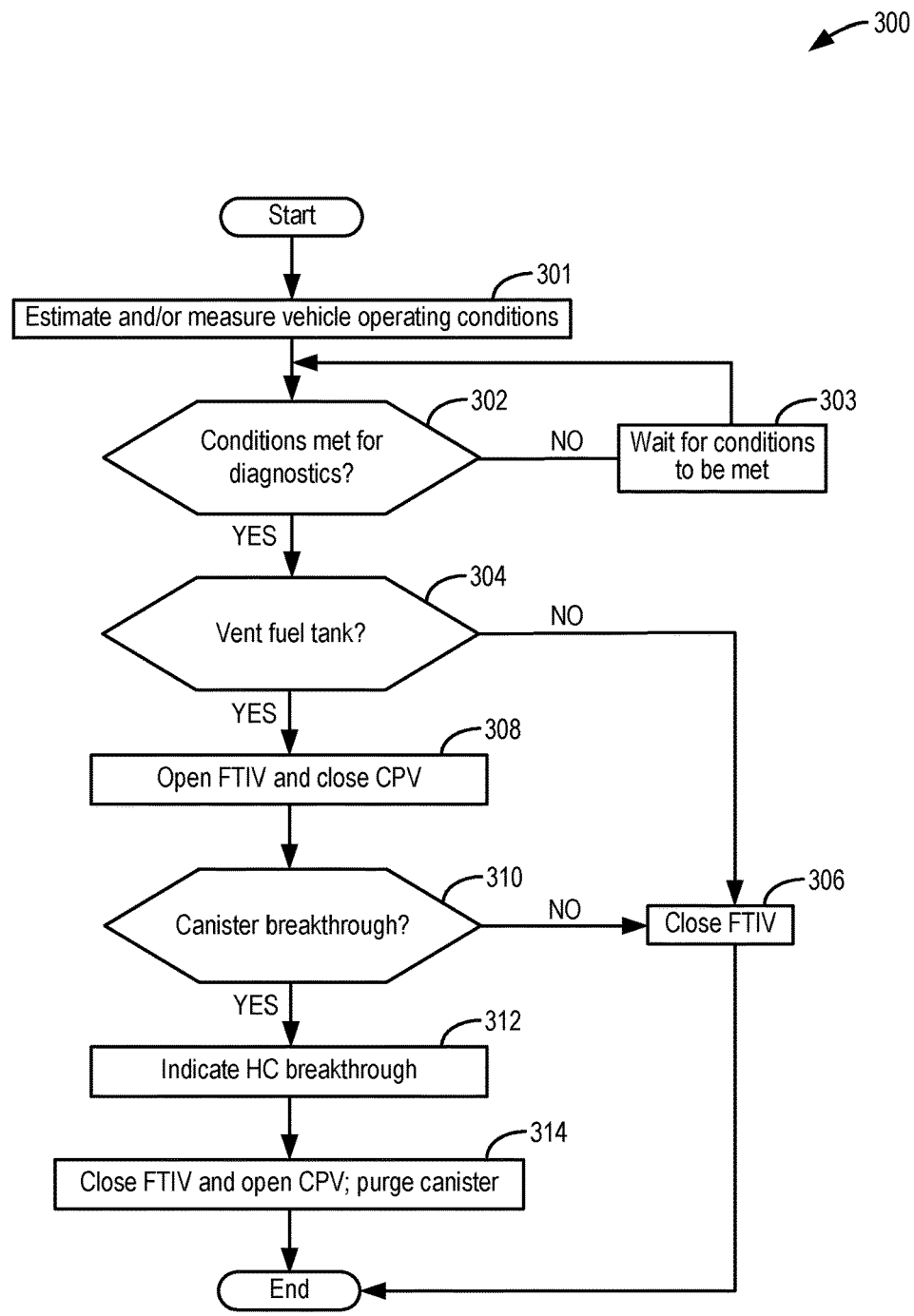
FIG. 3 shows a high-level flow chart of an example method for diagnosing a canister breakthrough in an evaporative emissions control system, such as the evaporative emissions control system of FIG. 2.
Figure 4A:
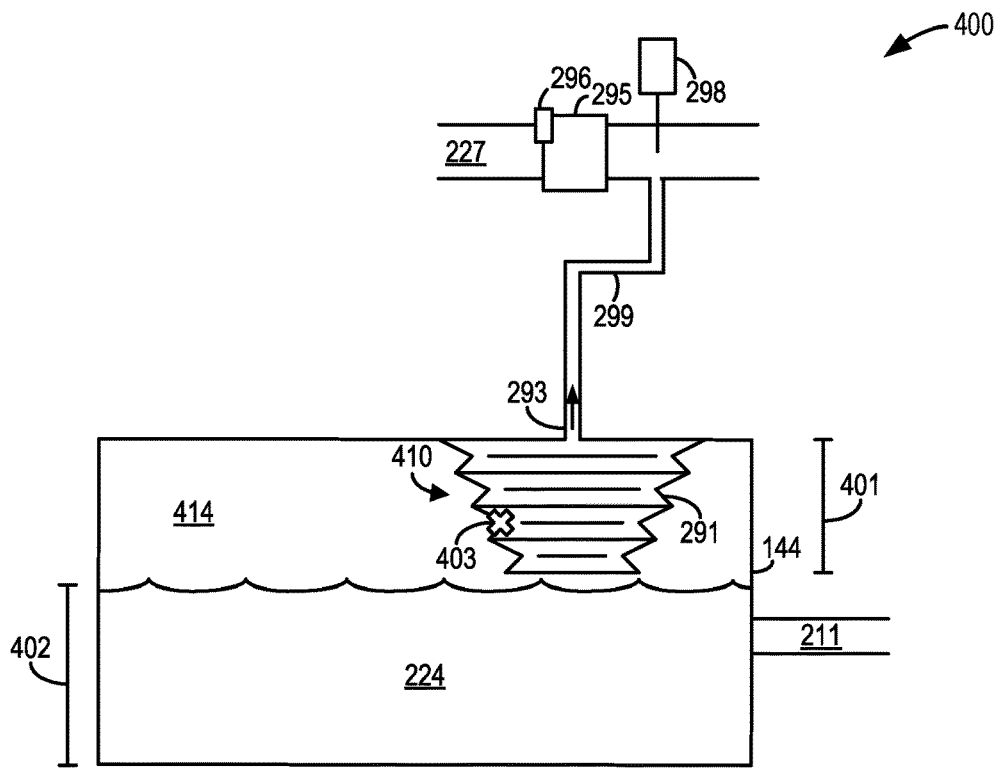
FIG. 4A illustrates entry conditions for an active diagnostic test of a variable volume device included in a fuel tank of a fuel system, such as the fuel system of FIG. 2.
Figure 4B:
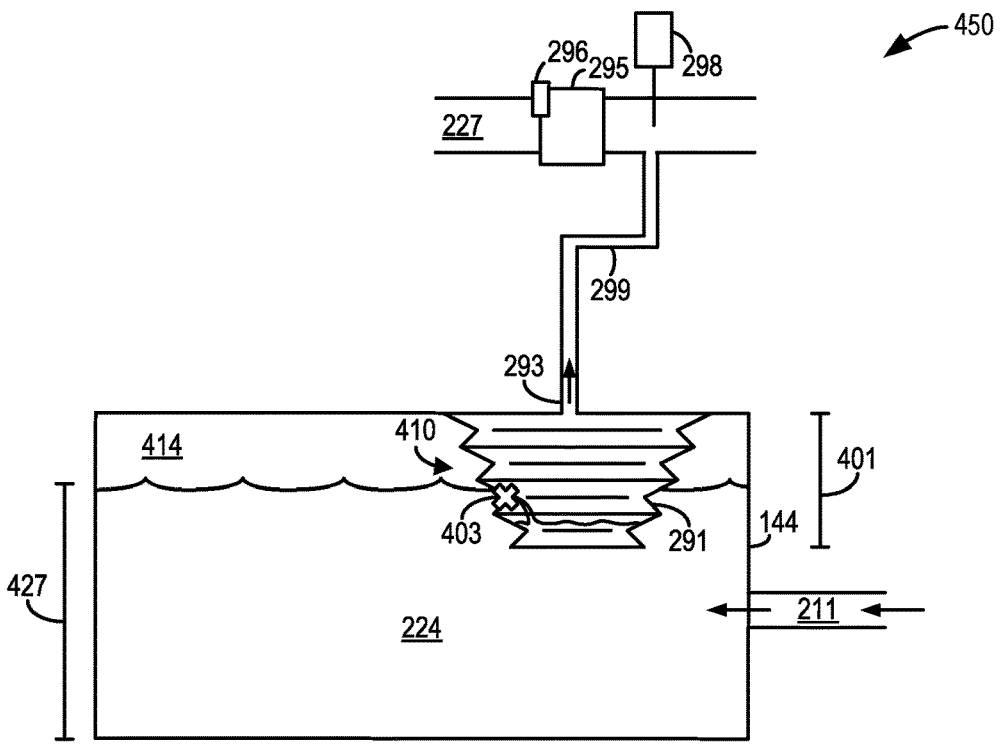
FIG. 4B illustrates entry conditions for a passive diagnostic test of a variable volume device included in a fuel tank of a fuel system, such as the fuel system of FIG. 2.

Referring now to FIG. 3, an example method 300 is shown for diagnosing leaks in a fuel vapor canister of a vehicle evaporative emissions control system, such as the evaporative emissions control system 251 described above with reference to FIGS. 1 and 2. Instructions for carrying out method 300 may be executed by a controller (e.g., controller 212) based on instructions stored on a memory of the controller and in conjunction with signals received from sensors of the engine system, such as the sensors described above with reference to FIGS. 1 and 2. Further, the controller may employ engine actuators (e.g., 281) of the engine system to adjust engine operation, e.g., responsive to a determination of a canister breakthrough, according to the method 300 as described below.

At 301, vehicle operating conditions are estimated by the controller. The controller (e.g., controller 212) acquires measurements from various sensors in the engine system and estimates operating conditions such as engine load, engine speed, engine temperature, and the load of the fuel vapor canister. The load of a canister (e.g., canister 222) is an amount of fuel vapor stored in the canister. In one example, the canister load may be estimated based on a first time elapsed since an immediately previous purge event wherein fuel vapor from the canister was routed to the engine for combustion. The canister load is further estimated based on a duration of opening of the FTIV (e.g., FTIV 252) such as during a refueling event following the immediately previous purge event to allow flow of fuel vapor from the fuel tank to the canister thereby increasing canister load. In another example, during purging, an estimated vapor amount/concentration can be used to determine the amount of fuel vapors stored in the canister, and then during a later portion of the purging operation (when the canister is sufficiently purged or empty), the estimated vapor amount/concentration can be used to estimate a loading state of the fuel vapor canister. In yet another example, canister load may be estimated based on outputs of one or more oxygen sensors coupled to the canister (e.g., downstream of the canister), or positioned in the engine intake and/or engine exhaust, to provide an estimate of a canister load. The controller may further detect states of the valves and measure fuel tank pressure with a pressure sensor.

At 302, the controller determines if conditions are met for canister diagnostics. As an example, the conditions may include the canister load being higher than a threshold load Q (e.g., not empty canister) and lower than a threshold load R (e.g., not at full capacity). If it is determined at 302 that the canister load is lower than the threshold load Q (i.e., canister is empty) or higher than the threshold load R (i.e., canister is in full capacity), the conditions for canister diagnostics are not met and method 300 moves on to 303. At 303, the method waits for conditions to be met. For example, the method may wait for an empty canister to be loaded such that the canister load is higher than the threshold load Q or the method may wait for a fully loaded canister to be purged to the intake manifold such that the canister load is lower than the threshold load R. Method 300 may then return to 302. If it is determined at 302 that the canister load is higher than the threshold load Q (e.g., not empty canister) and lower than the threshold load R (e.g., not at full capacity), the conditions for canister diagnostics are met and method 300 proceeds to 304.

At 304, the controller determines if the fuel tank (e.g., fuel tank 144) needs to be vented. As an example, the controller may determine to vent the fuel tank if the measured fuel tank pressure from 301 is higher than a predetermined non-zero threshold pressure. As another example, the controller may determine to vent the fuel tank during vehicle refueling. If the controller determines not to vent the fuel tank, method 300 moves on to 306, wherein the fuel tank may be isolated from the evaporative emissions control system by closing the FTIV (e.g., FTIV 252). Otherwise, method 300 proceeds to 308, wherein the controller opens FTIV (e.g., FTIV 252) and closes canister purge valve (e.g., 261) so that the fuel vapor canister enters the loading mode. Additionally, a canister vent valve (e.g., 229) and an ELCM changeover valve (e.g., 296) located in the vent line are adjusted to an opened position, thereby coupling the canister to atmosphere. During the loading mode, fuel vapors from the fuel tank are vented through the canister to atmosphere. HCs in the fuel vapors are adsorbed and stored in the canister.

At 310, the controller determines if there is a canister breakthrough. The HC sensor (e.g., HC sensor 298) coupled to the vent line (e.g., vent line 227) between the canister and the atmosphere monitors HC content in the vented fuel vapors to the atmosphere. If the HC content is lower than a threshold amount, it may indicate that there are no leaks in the canister and method 300 moves on to 306, wherein the fuel tank may be isolated from the evaporative emissions control system by closing the FTIV. If the HC content in the vented fuel vapors is higher than a threshold amount, canister leak may be determined and method 300 proceeds to 312 to indicate HC breakthrough from the canister and set a corresponding diagnostic code. Responsive to a positive determination of the leak, a vehicle operator may be notified and one or more engine operating parameters may be altered or adjusted (e.g., via actuation of actuators 281). The controller may close FTIV and open canister purge valve to purge the fuel vapor canister at 314. The controller may further increase the duration and frequency of canister purging at 314, in response to the leak. Additionally, the canister vent valve and the ELCM changeover valve located in the vent line may be adjusted to a closed position, thereby isolating the canister from the atmosphere. Furthermore, the controller may store the time that the diagnostic test for the fuel vapor canister is performed in the memory for future reference.

The method 300 (described above in FIG. 3) for diagnosing leaks in the fuel vapor canister may be performed before initiating the active or passive diagnostic methods (described later in FIGS. 5-7) for detecting leaks in the bellows of the fuel system. This ensures that no hydrocarbons are present in the vent line of the evaporative emissions control system from a canister leakage prior to conducting the diagnostic tests of the bellows. This also allows the use of a single hydrocarbon sensor for two different purposes: diagnosis of fuel vapor canister and diagnosis of bellows of the fuel tank.

Referring now to FIGS. 4A-4B, entry conditions are depicted for each of the active and passive diagnostic methods for diagnosing a leak/degradation in a bellows included in a fuel tank of a fuel system, such as the bellows 291 of the fuel system 140 shown in FIG. 2. More specifically, examples of the fuel tank 144 and the bellows 291 of FIG. 2 are shown in FIGS. 4A-4B, where the bellows 291 is in expanded state, and where a degradation condition exists in the bellows 291. As such, components previously introduced in FIG. 2 are numbered similarly in FIGS. 4A-4B and not reintroduced for brevity.

In FIG. 4A, an example view 400 shows fuel tank 144 having fuel 224 filled up to a fuel level 402. Fuel tank 144 is further shown being coupled to fuel filler pipe 211, where the fuel filler pipe is operable to fill the fuel tank with additional fuel 224. Bellows 291 is shown positioned within, and affixed to an interior of fuel tank 144 (bellows coupled to an upper wall of the fuel tank), the bellows extending downward from the upper wall of the fuel tank and not contacting any other walls of the fuel tank. In the example view 400, the bellows is at maximally expanded configuration (e.g., the bellows is expanded at a maximal extent 401). The atmospheric port 293 of bellows 291 is further shown being coupled to the HC sensor 298 via the vapor line 299.

Additionally, a fuel vapor pressure of a vapor space 414 in the fuel tank 144 (e.g., above fuel 224) may be maintained at, or near, an ambient pressure of the surrounding environment.

In the illustrated example, the fuel level 402 of the fuel tank 144 is below the maximum expansion level of the bellows (e.g., the bellows may be expanded at the maximal extent 401). An exemplary degradation state of the bellows may include a first side 410 of the bellows having a rupture 403. Since the fuel level 402 is present below the maximum expansion level of the bellows, the bellows 291 may be fully expanded without coming in contact with the fuel 224 and the degradation or the rupture 403 in the bellows 291 may be fully exposed in the vapor space 414. This allows any liquid fuel that may have leaked into the bellows 291 to drip back into the fuel tank 144, to expose the degradation. The fuel vapors in the vapor space 414 of the fuel tank 144 may be able to bleed into the bellows 291 via the rupture 403, which may be detected by the HC sensor 298 during the degradation detection routine. As a result, having a fuel level below the bellows 291 may be a precondition or an entry condition for running the active diagnostic routine disclosed herein to detect fuel system degradation.

In FIG. 4B, an example view 450 shows fuel tank 144 having fuel 224 filled up to a fuel level 402. Fuel tank 144 is further shown being coupled to fuel filler pipe 211, where the fuel filler pipe is operable to fill the fuel tank with additional fuel 224. Bellows 291 is shown positioned within, and affixed to an interior of, fuel tank 144, and in the maximally expanded configuration (e.g., the bellows is expanded at maximal extent 401). The atmospheric port 293 of bellows 291 is further shown being coupled to the HC sensor 298 via the vapor line 299. An exemplary degradation state of the bellows may include a first side 410 of the bellows having a rupture 403.

In the illustrated example, fuel 224 is actively being supplied to fuel tank 144 via fuel filler pipe 211. Accordingly, fuel 224 may fill fuel tank 144 at least to a fuel level 427 higher than fuel level 402. However, due to rupture 403, bellows 291 may not substantially compress as fuel 224 is supplied to fuel tank 144 such that the bellows may remain in the maximally expanded configuration is reached (e.g., the bellows remains expanded at, or near, maximal extent 401). As a result, the rupture 403 in the bellows 291 may be submerged in the fuel 224 rather than being exposed in the vapor space 414. As further shown, since fuel level 427 is inclusive of rupture 403, fuel 224 may enter the interior volume of bellows 291 via the rupture 403 and displace air within the bellows (which may be evacuated therefrom via atmospheric port 293). Due to the entry of fuel 224 in the bellows 291, fuel vapors may reach the HC sensor 298 via the vapor line 299, which may be detected by the HC sensor 298 during the degradation detection routine. As a result, having a fuel level above the bellows 291 may be a precondition or an entry condition for running the passive diagnostic routine disclosed herein to detect fuel system degradation. The fuel level may reach above the maximum expansion level of bellows either during a refueling event or during a vehicle drive resulting in a fuel sloshing due to vehicle dynamic movement.

In the illustrated example of FIGS. 4A-4B, the rupture is shown on the first side of the bellows. In other examples, however, the degradation or rupture may be present anywhere on the structure of the bellows, including but not limited to, a second side or a bottom of bellows, for example.

The diagnostics routine disclosed herein may be able to detect rupture or degradation present anywhere on the bellows.

Figure 5:
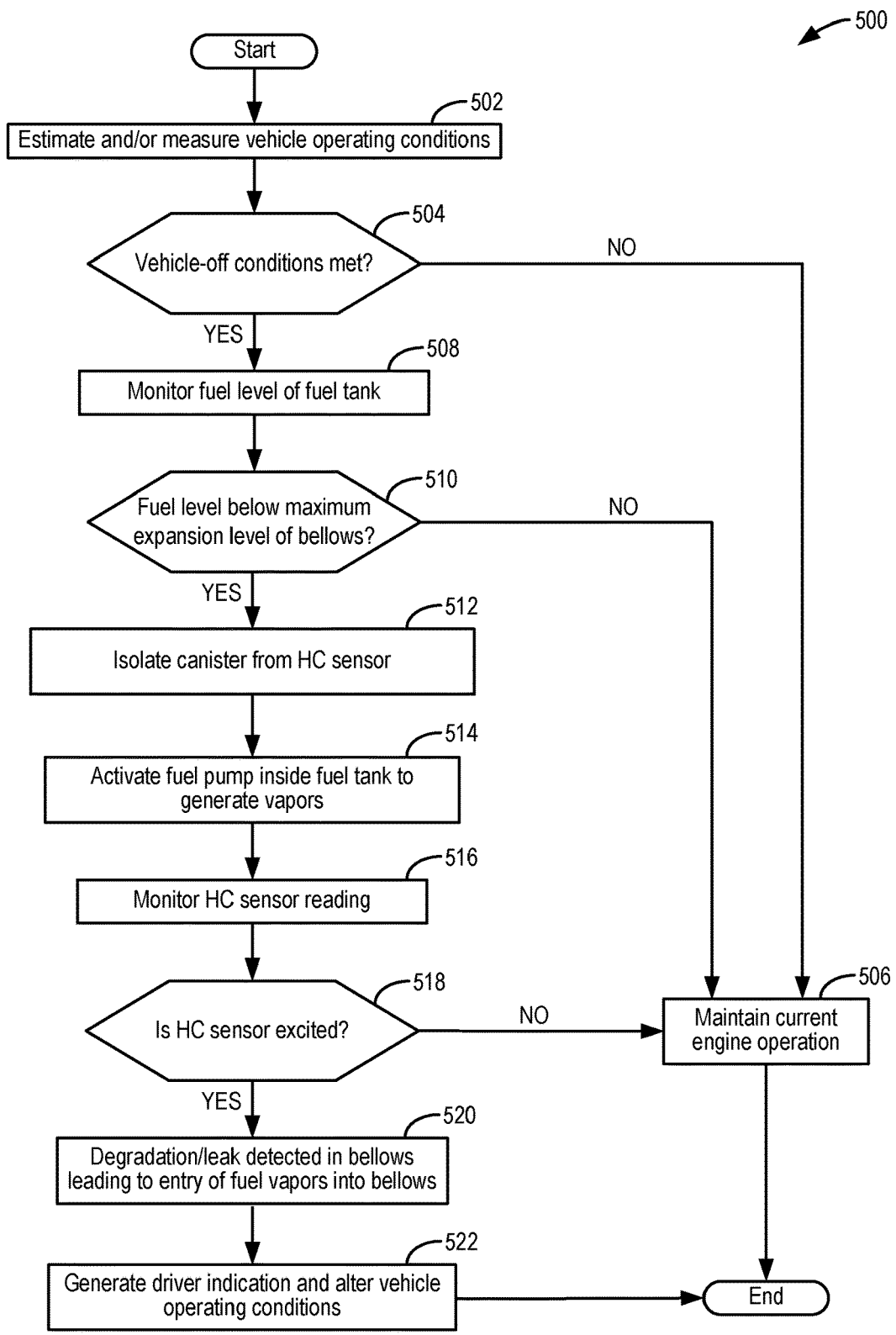
FIG. 5 shows a high-level flow chart of an example method for actively diagnosing a bellows included in a fuel tank of a fuel system, such as the fuel system of FIG. 2.

Referring now to FIG. 5, a flow chart of an example routine 500 for actively diagnosing a leak in a bellows coupled to a fuel tank of a vehicle system is shown. In some examples, the fuel tank and the bellows may be included in a fuel system designed for controlling fuel vapor pressures developed therein, such as the fuel system 140 of the vehicle system 206 described above with reference to FIGS. 1 and 2. As such, the fuel system may be coupled to an engine controller operable to execute routine 500, such as controller 212. Instructions for carrying out routine 500 may be executed by the engine controller based on instructions stored on a non-transitory memory of the engine controller and in conjunction with signals received from various sensors (e.g., 216), other components of the fuel system (e.g., 140), and other components of the vehicle coupled to the fuel system. Further, the engine controller may employ various engine actuators (e.g., 281) to adjust engine operation, e.g., responsive to a determination of fuel system degradation, according to routine 500 as described below. As such, routine 500 may enable active monitoring of the bellows coupled to the fuel tank, such that the fuel system may be accurately and efficiently diagnosed.

At 502, routine 500 may include estimating and/or measuring one or more vehicle operating conditions. In some examples, the one or more vehicle operating conditions may include one or more engine operating parameters, such as an engine speed, an engine load, an engine temperature, an engine coolant temperature, an engine oil temperature, a fuel temperature, a current operator torque demand, a manifold pressure, a manifold air flow, an exhaust gas air-fuel ratio, etc. In additional or alternative examples, the one or more vehicle operating conditions may include one or more ambient air conditions (e.g., of a surrounding environment), such as an ambient air pressure, an ambient air humidity, an ambient air temperature, etc. In some examples, the one or more vehicle operating conditions may be measured by one or more sensors communicatively coupled to the engine controller (e.g., the engine coolant temperature may be measured directly via a coolant temperature sensor) or may be inferred based on available data (e.g., the engine temperature may be estimated from the engine coolant temperature measured via the coolant temperature sensor).

Routine 500 may use the one or more vehicle operating conditions to infer a current state of vehicle operation, and determine whether to diagnose the fuel system (e.g., 140) based at least on one or more of the engine speed, the engine load, and the current operator torque demand. For example, at 504, routine 500 may include determining whether one or more vehicle-off conditions are met. In some examples, the one or more vehicle-off conditions may include one or more vehicle operating conditions immediately following receipt of a key-off request. For instance, the one or more vehicle-off conditions may include the engine speed being less than a threshold engine speed, the engine load being less than a threshold engine load, and/or current operator torque demand being less than a threshold operator torque demand. If the one or more vehicle-off conditions are not met (e.g., if the key-off request is not received or the engine speed, the engine load, or the current operator torque demand is greater than or equal to the respective threshold), routine 500 may proceed to 506, where routine 500 may include maintaining current engine operation. Specifically, combustion of fuel in cylinders (e.g., 230) of the engine (e.g., 110) may commence/continue and the vehicle may operate without interruption. Further, diagnosis of the fuel system (e.g., 140) may not be attempted again at least until a next vehicle-off event is successfully initiated.

If the one or more vehicle-off conditions are met (e.g., if the key-off request is received and the engine speed, the engine load, or the current operator torque demand is less than the respective threshold), routine 500 may proceed to 508, where routine 500 may include monitoring a fuel level of the fuel tank (e.g., 144) and whether the fuel level is below a threshold level. A fuel level sensor (e.g., 234) disposed within the fuel tank may provide an indication of the fuel level. The threshold level may be defined as the fuel level of the fuel tank at a maximum expansion level of the bellows (e.g., 291). In one example, performing the degradation/leak detection routine 500 may depend on the level of fuel in the fuel tank being low enough to allow the bellows (e.g., 291) to fully expand without coming in contact with liquid fuel in the fuel tank, as described in relation to FIG. 4A (e.g., the fuel level 402 of fuel tank in FIG. 4A). In one example, the threshold level is 40% of a capacity of the fuel tank. The threshold level may vary depending on the type, model, or volume of the bellows of the fuel tank.

At 510, routine 500 may include determining whether the fuel level of the fuel tank is below the maximum expansion level of the bellows. If it is determined at 510 that the fuel level is not below the maximum expansion level of the bellows, routine 500 may move on to 506, where routine 500 may include maintaining current engine operation and the diagnosis of the fuel system (e.g., 140) may not be attempted at least until a next vehicle-off event. Alternatively, if it is determined at 510 that the fuel level of the fuel tank is below the maximum expansion level of the bellows, routine 500 proceeds to 512.

At 512, routine 500 may include isolating a fuel vapor canister (e.g., canister 222) from a HC sensor (e.g., 298) coupled to a canister ventilation path (e.g., vent line 227) of an evaporative emissions control system (e.g., 251) of the vehicle system (e.g., 206). In some examples, the isolation of the fuel vapor canister from the HC sensor may be achieved by adjusting an ELCM changeover valve (e.g., ELCM COV 296) to a closed position. A closed ELCM changeover valve seals the fuel vapor canister from atmosphere, as described previously with reference to FIG. 2. In other examples, however, the fuel vapor canister may be isolated from the HC sensor by adjusting a canister vent valve (e.g., 229) to a closed position, which may also seal the canister from the atmosphere. This step configures the HC sensor (e.g., 298) to be non-responsive to the fuel vapor canister (e.g., 222) of the evaporative emissions control system. As such, any hydrocarbon vapors released from the fuel vapor canister in the canister ventilation path are not detected by the HC sensor during the diagnostic test of the fuel system. Once the fuel vapor canister is isolated from the HC sensor at 512, routine 500 may proceed to 514.

At 514, routine 500 may include activating a fuel pump (e.g., 221) included in the fuel tank (e.g., 144) of the fuel system (e.g., 140) of the vehicle system (e.g., 206). The activation of the fuel pump of the fuel system causes the fuel to be heated and agitated, leading to the generation of fuel vapors. Once the fuel vapors are generated, routine 500 may proceed to 516.

At 516, routine 500 may include monitoring the HC sensor (e.g., 298). As depicted in FIG. 2, a vapor line (e.g., 299) branching from the vent line (e.g., 227) near the hydrocarbon sensor (e.g., 298) fluidly couples the HC sensor to the atmospheric port (e.g., 293) of the bellows (e.g., 291) in the fuel tank. As such, the HC sensor may be configured to detect hydrocarbon vapor leaking through the bellows (if degraded), en route to atmosphere via the vapor line and the vent line. Accordingly, proceeding to 518, routine 500 may include indicating whether the HC sensor in the vent line of the evaporative emissions control system detects the presence or absence of fuel vapors released from the atmospheric port of the bellows of the fuel system.

If, at 518, it is indicated that the HC sensor is not responding subsequent to activation of the fuel pump, no leak or degradation in the bellows may be determined. Accordingly, routine 500 may proceed to 506, where routine 500 may include maintaining current engine operation. Specifically, combustion of fuel in cylinders (e.g., 230) of the engine (e.g., 110) may commence and the vehicle may operate without interruption. Further, diagnosis of the fuel system (e.g., 140) may not be attempted again at least until the next vehicle-off event is successfully initiated. Returning to 518, if it is indicated that the HC sensor detects the presence of hydrocarbons responsive to the activation of the fuel pump, routine 500 may proceed to 520, where a degradation or leak in the bellows may be determined and a corresponding diagnostic code may be set. A degraded or leaky bellows may allow entry of fuel vapors from the vapor space of the fuel tank into the bellows, such that the fuel vapors make its way via the atmospheric port of the bellows and the vapor line to the HC sensor and finally, to the atmosphere via the vent line. Responsive to a positive determination of the leak in the bellows, a vehicle operator may be notified and one or more vehicle operating conditions may be altered or adjusted (e.g., via actuation of actuators 281), at 522, so as to reduce HC emissions and maintain the fuel vapor pressure of the fuel tank within a predetermined range. In some examples, a generated driver indication may be displayed to the vehicle operator (e.g., 102) at a vehicle instrument panel (e.g., 196) or other display visible to the vehicle operator. In such examples, the driver indication may indicate a presence of the leak in the bellows of the fuel tank, in addition to instructions for repairing the leak or recommendations as to maintenance of the degraded component. Additionally or alternatively, the driver indication may include lighting a malfunction indicator lamp (MIL) and the diagnostic code may be set and stored in the memory of the engine controller. In one example, lighting the MIL may indicate a request that the vehicle be taken to a service technician, and the diagnostic code that is set may indicate to the service technician that the bellows included in the fuel tank is degraded. The light and the code may reset after the vehicle has been serviced and the degraded bellows has been replaced or repaired.

When the bellows (e.g., 291) leaks, at least a portion of the fuel vapor in the fuel tank (e.g., 144) may pass through the bellows and escape through the atmospheric port (e.g., 293) and the vapor line coupled to the bellows. Accordingly, to mitigate an amount of untreated fuel vapors escaping from the fuel tank, one or more of the vehicle operating conditions that generate excess fuel vapors may be altered or adjusted. For instance, one or more of the engine operating parameters may be altered or adjusted (e.g., minimized, maintained below respective thresholds, lowered to near or at zero, etc.), including, for example, one or more of the engine speed and the engine load. Additionally or alternatively, the engine controller (e.g., controller 212) may command the vehicle enter an electric drive mode, where only a motor (e.g., 120) may propel drive wheels (e.g., 130) of the vehicle so that the fueling system (e.g., 140) is not relied upon to power the engine (e.g., 110). Additionally or alternatively, an FTIV (e.g., 252) coupling the fuel tank (e.g., 144) to the fuel vapor canister (e.g., 222) may be adjusted to a fully open position to vent at least some of the fuel vapor in the fuel tank. Additionally or alternatively, the driver indication may include an advisory against parking the vehicle on an inclined slope greater than a threshold incline, such as 6%. The one or more vehicle operating conditions may remain altered or adjusted until servicing of the fuel system may be performed and the bellows of the fuel tank is repaired.

In this way, the fuel system may be actively monitored and subsequently diagnosed, such that vehicle performance may be maintained or improved (e.g., by expedient notification and mitigation of fuel system degradation), vehicle operator experience may be enhanced (e.g., alternative fuel vapor pressure control may be implemented to reduce fuel tank depressurization inconveniences without sacrificing system reliability), and overall manufacturing costs may be reduced (e.g., additional or specialized components may be minimized and complex depressurization/venting fuel system configurations may be simplified).

Figure 6:
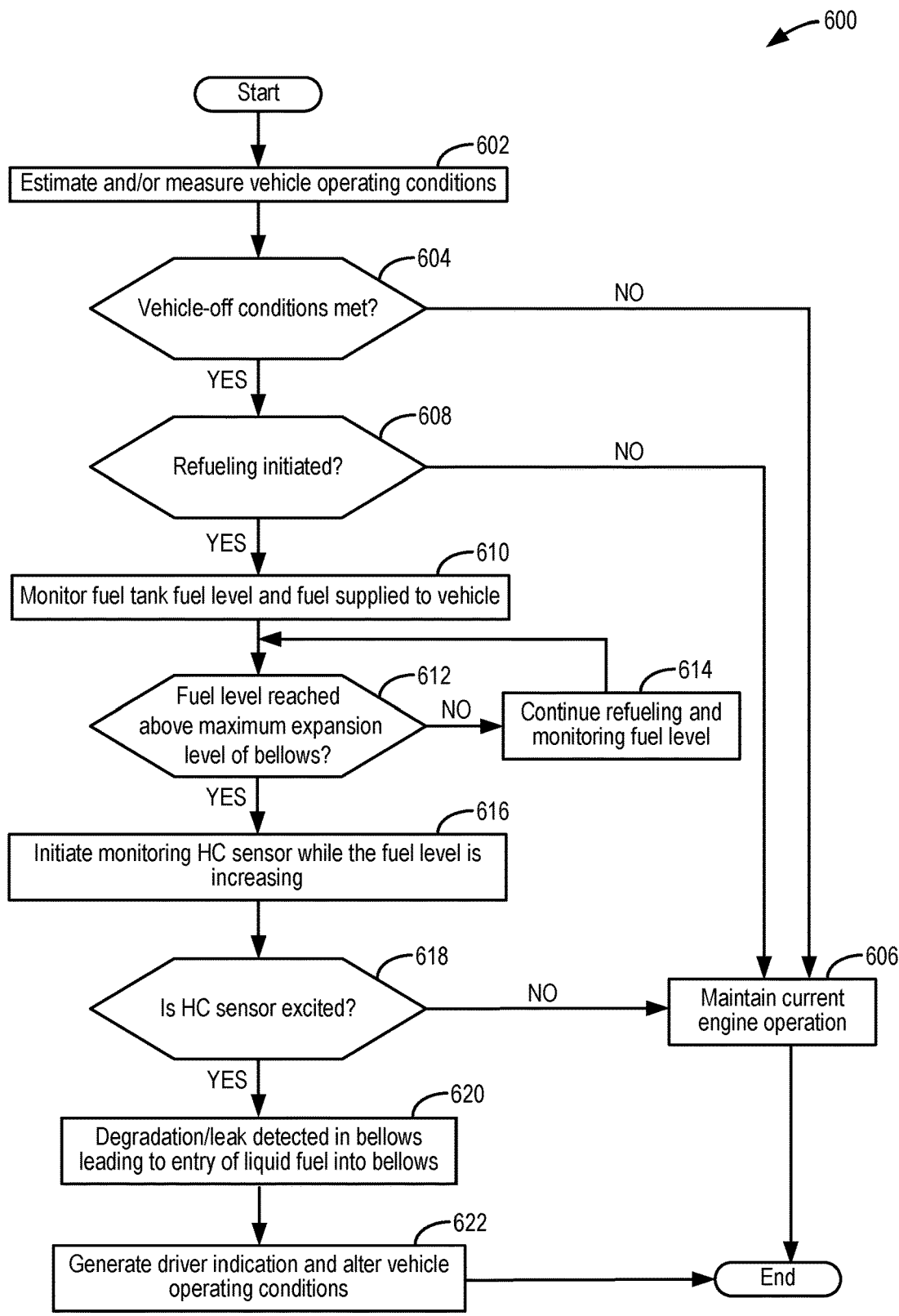
FIG. 6 shows a high-level flow chart of a first example method for passively diagnosing a bellows included in a fuel tank of a fuel system, such as the fuel system of FIG. 2.

Two additional control routines for diagnosing degradation to a fuel system is described in detail below with reference to FIGS. 6 and 7. Referring now to FIG. 6, a flow chart of an example routine 600 for passively diagnosing a leak in a bellows coupled to the fuel tank is shown. In some examples, the fuel tank and the bellows may be included in a fuel system designed for controlling fuel vapor pressures developed therein, such as fuel system 140 described above with reference to FIGS. 1 and 2. As such, the fuel system may be coupled to an engine controller operable to execute routine 600, such as controller 212. For example, the engine controller (e.g., controller 212) may be operable to receive one or more current vehicle operating conditions to determine whether a vehicle including the fuel system (e.g., 140) is in a vehicle-off condition and thereby ready for refueling. Thereafter, during the refueling (e.g., via refueling system 219), various fueling parameters may be monitored (e.g., based on feedback from sensors 216) and a hydrocarbon sensor may be monitored to determine a leak in the bellows (e.g., 291) coupled to the fuel tank (e.g., 144). Responsive to a positive determination of the leak, a vehicle operator (e.g., 102) may be notified and one or more engine operating parameters may be altered or adjusted (e.g., via actuation of actuators 281). In this way, the fuel system may be passively monitored and subsequently diagnosed, such that vehicle performance may be maintained or improved (e.g., by expedient notification and mitigation of fuel system degradation), vehicle operator experience may be enhanced (e.g., bellows-based fuel vapor pressure control may be implemented to reduce fuel tank depressurization inconveniences without sacrificing system reliability), and overall manufacturing costs may be reduced (e.g., additional or specialized components may be minimized and complex depressurization/venting fuel system configurations may be simplified).

Instructions for carrying out routine 600 may be executed by the engine controller (e.g., controller 212) based on instructions stored on a non-transitory memory of the engine controller and in conjunction with signals received from various sensors (e.g., 216), other components of the fuel system (e.g., 140), other components of the vehicle coupled to the fuel system, and systems external to the vehicle and coupled thereto via a wireless network (e.g., 131). Further, the engine controller may employ various engine actuators (e.g., 281) to adjust engine operation, e.g., responsive to a determination of fuel system degradation, according to routine 600 as described below. As such, routine 600 may enable passive monitoring of fueling parameters and the HC sensor during a refueling event, such that the fuel system (e.g., 140) may be accurately and efficiently diagnosed.

At 602, routine 600 may include estimating and/or measuring one or more vehicle operating conditions. In some examples, the one or more vehicle operating conditions may include one or more engine operating parameters, such as an engine speed, an engine load, an engine temperature, an engine coolant temperature, a fuel temperature, a current operator torque demand, a manifold pressure, a manifold air flow, an exhaust gas air-fuel ratio, etc. In additional or alternative examples, the one or more vehicle operating conditions may include one or more ambient air conditions (e.g., of a surrounding environment), such as an ambient air pressure, an ambient air humidity, an ambient air temperature, etc. In some examples, the one or more vehicle operating conditions may be measured by one or more sensors communicatively coupled to the engine controller (e.g., the engine coolant temperature may be measured directly via a coolant temperature sensor) or may be inferred based on available data (e.g., the engine temperature may be estimated from the engine coolant temperature measured via the coolant temperature sensor).

Routine 600 may use the one or more vehicle operating conditions to infer a current state of vehicle operation, and determine whether to diagnose the fuel system (e.g., 140) based at least on one or more of the engine speed, the engine load, and the current operator torque demand. For example, at 604, routine 600 may include determining whether one or more vehicle-off conditions are met. In some examples, the one or more vehicle-off conditions may include one or more vehicle operating conditions immediately following receipt of a key-off request. For instance, the one or more vehicle-off conditions may include the engine speed being less than a threshold engine speed, the engine load being less than a threshold engine load, and/or current operator torque demand being less than a threshold operator torque demand. If the one or more vehicle-off conditions are not met (e.g., if the key-off request is not received or the engine speed, the engine load, or the current operator torque demand is greater than or equal to the respective threshold), routine 600 may proceed to 606, where routine 600 may include maintaining current engine operation. Specifically, combustion of fuel in cylinders (e.g., 230) of the engine (e.g., 110) may commence/continue and the vehicle may operate without interruption. Further, diagnosis of the fuel system (e.g., 140) may not be attempted again at least until a next vehicle-off event is successfully initiated. However, if the one or more vehicle-off conditions are met (e.g., if the key-off request is received and the engine speed, the engine load, or the current operator torque demand is less than the respective threshold) at 604, routine 600 may proceed to 608.

At 608, routine 600 may include determining whether a refueling event has initiated. In some examples, the refueling event may be determined to be initiated when a fuel level of the fuel tank (e.g., 144) increases at a higher than threshold rate for a threshold duration. In other examples, the refueling event may be determined to be initiated responsive to a signal received from an external fuel pump via the wireless network (e.g., 131) indicating that the external fuel pump has started dispensing fuel to the vehicle. In other examples, the refueling event may be determined to be initiated responsive to the fuel dispensing device (e.g., 170) being fluidically coupled to the refueling system (e.g., 219) of the vehicle. If it is determined, at 608, that the refueling event has not initiated (e.g., if the fuel level has not increased within the threshold duration), routine 600 may proceed to 606, where routine 600 may include maintaining current engine operation. Specifically, combustion of fuel in cylinders (e.g., 230) of the engine (e.g., 110) may commence and the vehicle may operate without interruption. Further, diagnosis of the fuel system (e.g., 140) may not be attempted again at least until a next refueling event is successfully initiated. Alternatively, if it is determined that the refueling event has initiated at 608 (e.g., if the fuel level has increased within the threshold duration), routine 600 may proceed to 610.

At 610, routine 600 may include monitoring the fuel level of the fuel tank (e.g., 144) during refueling and whether the fuel level reaches above a threshold level. A fuel level sensor (e.g., 234) disposed within the fuel tank may provide an indication of the fuel level. The threshold level may be defined as the fuel level of the fuel tank at a maximum expansion level of the bellows (e.g., 291). In one example, performing the degradation/leak detection routine 600 may depend on the level of fuel in the fuel tank being high enough to allow the bellows (e.g., 291) to be submerged in the liquid fuel (e.g., 224), as described in relation to FIG. 4B (e.g., the fuel level 427 of fuel tank in FIG. 4B). In one example, the threshold level is 40% of a capacity of the fuel tank. The threshold level may vary depending on the type, model, or volume of the bellows of the fuel tank.

At 612, routine 600 may include determining whether the fuel level of the fuel tank is above the maximum expansion level of the bellows such that at least a portion of the bellows is submerged in fuel. If it is determined at 612 that the fuel level has not reached above the maximum expansion level of the bellows, routine 600 may move on to 614, where routine 600 may include continuing the refueling event and the monitoring of the fuel level while the fuel is being supplied to the fuel tank. Routine 600 may then return to 612. Alternatively, if it is determined at 612 that the fuel level of the fuel tank has reached above the maximum expansion level of the bellows, routine 600 may proceed to 616.

At 616, routine 600 may include initiating the monitoring of a hydrocarbon sensor (e.g., 298) of an evaporative emissions control system (e.g., 251) while the fuel level of the fuel tank increases during the refueling event. As depicted previously in FIG. 2, a vapor line (e.g., 299) branching from a vent line (e.g., 227) of the evaporative emissions control system near the hydrocarbon sensor (e.g., 298) fluidly couples the HC sensor to an atmospheric port (e.g., 293) of the bellows (e.g., 291) in the fuel tank. As such, the HC sensor (e.g., 298) may be configured to detect hydrocarbon vapor leaking through the bellows (if degraded), en route to atmosphere via the vapor line. Accordingly, proceeding to 618, routine 600 may include indicating whether the HC sensor in the vent line of the evaporative emissions control system detects the presence or absence of fuel vapors released from the atmospheric port of the bellows of the fuel system.

If, at 618, it is indicated that the HC sensor is not responding during the refueling event, no leak or degradation in the bellows may be determined. Accordingly, routine 600 may proceed to 606, where routine 600 may include maintaining current engine operation. Specifically, combustion of fuel in cylinders (e.g., 230) of the engine (e.g., 110) may commence and the vehicle may operate without interruption. Further, diagnosis of the fuel system (e.g., 140) may not be attempted again at least until the next refueling event is successfully initiated.

Returning to 618, if it is indicated that the HC sensor detects the presence of hydrocarbons during the refueling event, routine 600 may proceed to 620, where a degradation or leak in the bellows may be determined and a corresponding diagnostic code may be set. During refueling, as the fuel level of the fuel tank increases above the maximum expansion level of the bellows, a degraded or leaky bellows may allow entry of liquid fuel into the interior volume of the bellows (e.g., 291) through a rupture (e.g., 403), thereby displacing air within the bellows. Due to the entry of fuel (e.g., 224) into the bellows (e.g., 291), fuel vapors may reach the HC sensor via the atmospheric port of the bellows and the vapor line, and finally reach the atmosphere via the vent line. Therefore, responsive to a positive determination of the leak in the bellows, a vehicle operator may be notified and one or more vehicle operating conditions may be altered or adjusted (e.g., via actuation of actuators 281), at 622, so as to reduce HC emissions and maintain the fuel vapor pressure of the fuel tank within a predetermined range. In some examples, a generated driver indication may be displayed to the vehicle operator (e.g., 102) at a vehicle instrument panel (e.g., 196) or other display visible to the vehicle operator. In such examples, the driver indication may indicate a presence of the leak in the bellows of the fuel tank, in addition to instructions for repairing the leak or recommendations as to maintenance of the degraded component. Additionally or alternatively, the driver indication may include lighting a malfunction indicator lamp (MIL) and the diagnostic code may be set and stored in the memory of the engine controller. In one example, lighting the MIL may indicate a request that the vehicle be taken to a service technician, and the diagnostic code that is set may indicate to the service technician that the bellows included in the fuel tank is degraded. The light and the code may reset after the vehicle has been serviced and the degraded bellows has been replaced or repaired.

When the bellows (e.g., 291) leaks, at least a portion of the liquid fuel may enter into the bellows and at least a portion of the fuel vapor in the fuel tank (e.g., 144) may escape through the atmospheric port (e.g., 293) and the vapor line coupled to the bellows. Accordingly, to mitigate an amount of untreated fuel vapors escaping from the fuel tank, one or more of the vehicle operating conditions that generate excess fuel vapors may be altered or adjusted. For instance, one or more of the engine operating parameters may be altered or adjusted (e.g., minimized, maintained below respective thresholds, lowered to near or at zero, etc.), including, for example, one or more of the engine speed and the engine load. Additionally or alternatively, the engine controller (e.g., controller 212) may command the vehicle enter an electric drive mode, where only a motor (e.g., 120) may propel drive wheels (e.g., 130) of the vehicle so that the fueling system (e.g., 140) is not relied upon to power the engine (e.g., 110). Additionally or alternatively, an FTIV (e.g., 252) coupling the fuel tank (e.g., 144) to the fuel vapor canister (e.g., 222) may be adjusted to a fully open position to vent at least some of the fuel vapor in the fuel tank. Additionally or alternatively, the driver indication may include an advisory against parking the vehicle on an inclined slope greater than a threshold incline, such as 6%. The one or more vehicle operating conditions may remain altered or adjusted until servicing of the fuel system may be performed and the bellows of the fuel tank is repaired.

Figure 7:
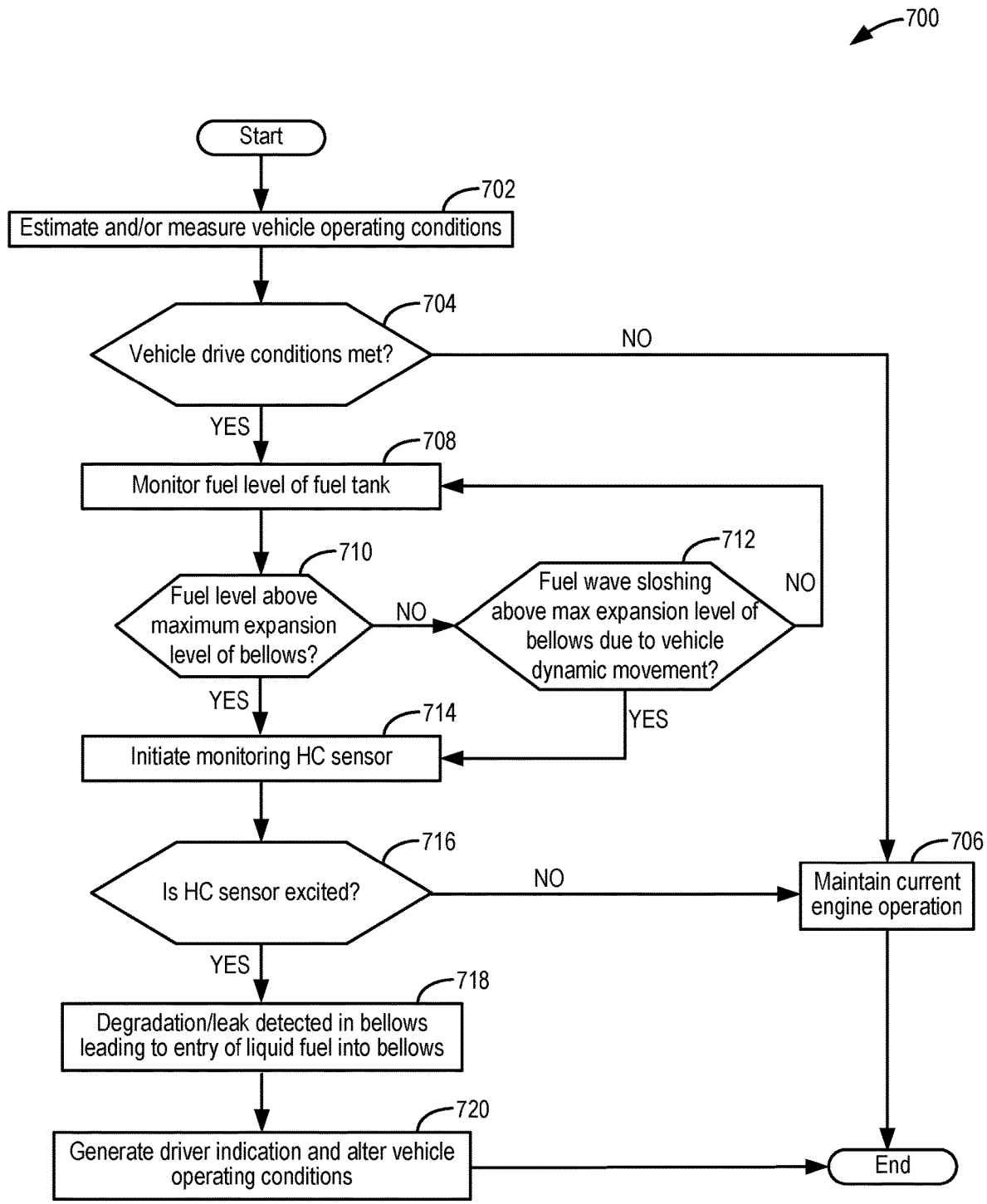
FIG. 7 shows a high-level flow chart of a second example method for passively diagnosing a bellows included in a fuel tank of a fuel system, such as the fuel system of FIG. 2.
Figure 8:
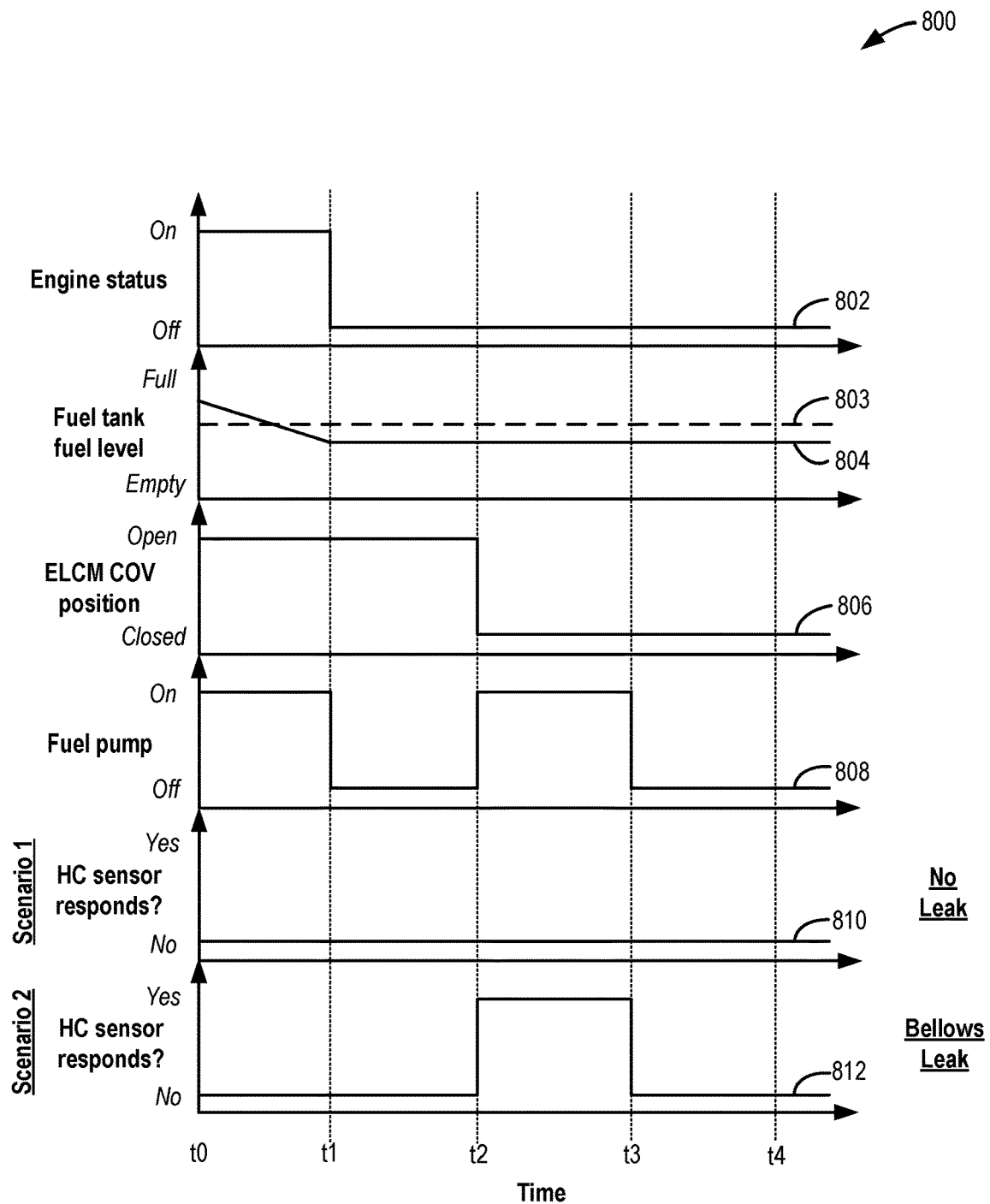
FIG. 8 shows an example timeline for a diagnostics routine of a fuel system, such as the fuel system of FIG. 2.

Turning to FIG. 7, a flow chart of an example routine 700 for passively diagnosing a leak in a bellows coupled to a fuel tank of a vehicle system is shown. In some examples, the fuel tank and the bellows may be included in a fuel system designed for controlling fuel vapor pressures developed therein, such as the fuel system 140 of the vehicle system 206 described above with reference to FIGS. 1 and 2. As such, the fuel system may be coupled to an engine controller operable to execute routine 700, such as controller 212. Instructions for carrying out routine 700 may be executed by the engine controller based on instructions stored on a non-transitory memory of the engine controller and in conjunction with signals received from various sensors (e.g., 216), other components of the fuel system (e.g., 140), and other components of the vehicle coupled to the fuel system. Further, the engine controller may employ various engine actuators (e.g., 281) to adjust engine operation, e.g., responsive to a determination of fuel system degradation, according to routine 700 as described below. As such, routine 700 may enable passive monitoring of the bellows coupled to the fuel tank, such that the fuel system may be accurately and efficiently diagnosed.

At 702, routine 700 may include estimating and/or measuring one or more vehicle operating conditions. In some examples, the one or more vehicle operating conditions may include one or more engine operating parameters, such as an engine speed, an engine load, an engine temperature, an engine coolant temperature, a fuel temperature, a current operator torque demand, a manifold pressure, a manifold air flow, an exhaust gas air-fuel ratio, etc. In additional or alternative examples, the one or more vehicle operating conditions may include one or more ambient air conditions (e.g., of a surrounding environment), such as an ambient air pressure, an ambient air humidity, an ambient air temperature, etc. In some examples, the one or more vehicle operating conditions may be measured by one or more sensors communicatively coupled to the engine controller (e.g., the engine coolant temperature may be measured directly via a coolant temperature sensor) or may be inferred based on available data (e.g., the engine temperature may be estimated from the engine coolant temperature measured via the coolant temperature sensor).

Routine 700 may use the one or more vehicle operating conditions to infer a current state of vehicle operation, and determine whether to diagnose the fuel system (e.g., 140) based at least on one or more of the engine speed, the engine load, and the current operator torque demand. For example, at 704, routine 700 may include determining whether one or more vehicle drive conditions are met. In some examples, the one or more vehicle drive conditions may include one or more vehicle operating conditions immediately following receipt of a key-on request. For instance, the one or more vehicle drive conditions may include the engine speed being greater than or equal to a threshold engine speed, the engine load being greater than or equal to a threshold engine load, and/or current operator torque demand being greater than or equal to a threshold operator torque demand. If the one or more vehicle drive conditions are not met (e.g., if the key-on request is not received or the engine speed, the engine load, or the current operator torque demand is less than the respective threshold), routine 700 may proceed to 706, where routine 700 may include maintaining current engine operation. Specifically, combustion of fuel in cylinders (e.g., 230) of the engine (e.g., 110) may not commence and the vehicle may remain in a vehicle-off condition without interruption. Further, diagnosis of the fuel system (e.g., 140) may not be attempted again at least until a next vehicle drive event is successfully initiated.

If the one or more vehicle drive conditions are met (e.g., if the key-on request is received and the engine speed, the engine load, or the current operator torque demand is greater than or equal to the respective threshold), routine 700 may proceed to 708, where routine 700 may include monitoring a fuel level of the fuel tank (e.g., 144) and whether the fuel level is above a threshold level. A fuel level sensor (e.g., 234) disposed within the fuel tank may provide an indication of the fuel level. The threshold level may be defined as the fuel level of the fuel tank at a maximum expansion level of the bellows (e.g., 291). In one example, performing the degradation/leak detection routine 700 may depend on the fuel level of fuel in the fuel tank being high enough to allow the bellows (e.g., 291) to be submerged in the liquid fuel (e.g., 224), as described in relation to FIG. 4B (e.g., the fuel level 427 of fuel tank in FIG. 4B). In one example, the threshold level is 40% of a capacity of the fuel tank. The threshold level may vary depending on the type, model, or volume of the bellows of the fuel tank.

At 710, routine 700 may include determining whether the fuel level of the fuel tank is above the maximum expansion level of the bellows such that at least a portion of the bellows is submerged in fuel. If it is determined at 710 that the fuel level is not above the maximum expansion level of the bellows, routine 700 may move on to 712, where routine 700 may include determining whether a vehicle dynamic movement results in a fuel wave sloshing above the maximum expansion level of the bellows. For example, if the vehicle is accelerating up and down on a sloping road, it may result in an irregular movement of fuel in the fuel tank. In another example, if the vehicle is traversing through a rough terrain or going through speed bumps on the road, the dynamic movement may cause fuel sloshing above maximum expansion level of the bellows. If it is determined at 712 that fuel wave sloshing has not occurred, routine 700 may return to 708, where routine 700 may include monitoring the fuel level of the fuel tank. Alternatively, if it is determined at 712 that a vehicle dynamic movement has resulted in a fuel wave sloshing above the maximum expansion level of the bellows, routine 700 may proceed to 714. Additionally, if it is determined at 710 that the fuel level of the fuel tank is above the maximum expansion level of the bellows, routine 700 may proceed to 714.

At 714, routine 700 may include initiating the monitoring of a hydrocarbon sensor (e.g., 298) of an evaporative emissions control system (e.g., 251). As depicted previously in FIG. 2, a vapor line (e.g., 299) branching from a vent line (e.g., 227) of the evaporative emissions control system near the hydrocarbon sensor (e.g., 298) fluidly couples the HC sensor to an atmospheric port (e.g., 293) of the bellows (e.g., 291) in the fuel tank. As such, the HC sensor (e.g., 298) may be configured to detect hydrocarbon vapor leaking through the bellows (if degraded), en route to atmosphere via the vapor line. Accordingly, proceeding to 716, routine 700 may include indicating whether the HC sensor in the vent line of the evaporative emissions control system detects the presence or absence of fuel vapors released from the atmospheric port of the bellows of the fuel system.

If, at 716, it is indicated that the HC sensor is not responding subsequent to the fuel slosh event, no leak or degradation in the bellows may be determined. Accordingly, routine 700 may proceed to 706, where routine 700 may include maintaining current engine operation. Specifically, combustion of fuel in cylinders (e.g., 230) of the engine (e.g., 110) may continue and the vehicle may operate without interruption. Further, diagnosis of the fuel system (e.g., 140) may not be attempted again at least until a next vehicle drive event is successfully initiated.

Returning to 716, if it is indicated that the HC sensor detects the presence of hydrocarbons subsequent to the fuel slosh event, routine 700 may proceed to 718, where a possible degradation or leak in the bellows may be determined and a corresponding diagnostic code may be set. During the fuel slosh event, as the fuel level goes above the maximum expansion level of the bellows, a degraded or leaky bellows may allow entry of liquid fuel into the interior volume of the bellows (e.g., 291) through a rupture (e.g., 403), thereby displacing air within the bellows. Due to the entry of fuel (e.g., 224) into the bellows (e.g., 291), fuel vapors may reach the HC sensor via the atmospheric port of the bellows and the vapor line, and finally reach the atmosphere via the vent line. The possible degradation or leak in the bellows may be confirmed further by carrying out method 500, as described previously in FIG. 5.

Therefore, responsive to a positive determination of the leak in the bellows, a vehicle operator may be notified and one or more vehicle operating conditions may be altered or adjusted (e.g., via actuation of actuators 281), at 720, so as to reduce HC emissions and maintain the fuel vapor pressure of the fuel tank within a predetermined range. In some examples, a generated driver indication may be displayed to the vehicle operator (e.g., 102) at a vehicle instrument panel (e.g., 196) or other display visible to the vehicle operator. In such examples, the driver indication may indicate a presence of the leak in the bellows of the fuel tank, in addition to instructions for repairing the leak or recommendations as to maintenance of the degraded component. Additionally or alternatively, the driver indication may include lighting a malfunction indicator lamp (MIL) and the diagnostic code may be set and stored in the memory of the engine controller. In one example, lighting the MIL may indicate a request that the vehicle be taken to a service technician, and the diagnostic code that is set may indicate to the service technician that the bellows included in the fuel tank is degraded. The light and the code may reset after the vehicle has been serviced and the degraded bellows has been replaced or repaired.

When the bellows (e.g., 291) leaks, at least a portion of the liquid fuel may enter into the bellows and at least a portion of the fuel vapor in the fuel tank (e.g., 144) may escape through the atmospheric port (e.g., 293) and the vapor line coupled to the bellows. Accordingly, to mitigate an amount of untreated fuel vapors escaping from the fuel tank, one or more of the vehicle operating conditions that generate excess fuel vapors may be altered or adjusted. For instance, one or more of the engine operating parameters may be altered or adjusted (e.g., minimized, maintained below respective thresholds, lowered to near or at zero, etc.), including, for example, one or more of the engine speed and the engine load. Additionally or alternatively, the engine controller (e.g., controller 212) may command the vehicle enter an electric drive mode, where only a motor (e.g., 120) may propel drive wheels (e.g., 130) of the vehicle so that the fueling system (e.g., 140) is not relied upon to power the engine (e.g., 110). Additionally or alternatively, an FTIV (e.g., 252) coupling the fuel tank (e.g., 144) to the fuel vapor canister (e.g., 222) may be adjusted to a fully open position to vent at least some of the fuel vapor in the fuel tank. Additionally or alternatively, the driver indication may include an advisory against parking the vehicle on an inclined slope greater than a threshold incline, such as 6%. The one or more vehicle operating conditions may remain altered or adjusted until servicing of the fuel system may be performed and the bellows of the fuel tank is repaired.

Turning now to FIG. 8, a timing diagram 800 is shown that illustrates a sequence of actions performed within a diagnostic procedure for actively diagnosing a degradation/leak in a bellows within a fuel tank of a fuel system of a HEV vehicle. The diagnostic procedure may be the same as or similar to the procedure described above in reference to steps 502-522 of method 500 in FIG. 5. The bellows of the fuel tank of the fuel system of the vehicle may be the same as or similar to the bellows 291 of the fuel tank 144 of the fuel system 140 of FIG. 2 and/or the bellows 291 of the fuel tank 144 of FIG. 4A. Instructions for performing the actions described in the timing diagram 800 of FIG. 8 may be executed by a controller (e.g., the controller 212 of control system 190 of FIG. 2) based on instructions stored on a memory of the controller and in conjunction with signals received from sensors of the vehicle system, such as the sensors 216 of the vehicle system 206 described above with reference to FIGS. 1 and 2.

Timing diagram 800 shows plots 802, 804, 806, 808, 810, and 812, which illustrate states of components of the vehicle system over time. Plot 802 indicates a state of an engine of the vehicle system (e.g., the engine 110 of the vehicle system 206 of FIG. 2), which may be in an ON state or an OFF state. Plot 804 indicates a fuel level of a fuel tank (e.g., the fuel level 402 of the fuel tank 144 of FIG. 4A), which may be between FULL and EMPTY. Dotted line 803 represents a threshold level of fuel in the fuel tank, which may be defined as the fuel level at a maximum expansion level of the bellows (e.g., the bellows expanded at maximal extent 401 in FIG. 4A). When the fuel level is below the threshold level 803, any part of the bellows is not in contact with liquid fuel in the tank. Plot 806 indicates a state of an ELCM changeover valve (e.g., the changeover valve 296 of the ELCM 295 of FIG. 2), which may be in an OPEN position or a CLOSED position. Plot 808 indicates a state of a fuel pump (e.g., the fuel pump system 221 of the vehicle system 206 of FIG. 2), which may be in an ON state or an OFF state. Plots 810 and 812 show response of a hydrocarbon sensor over time (e.g., the HC sensor 298 of the vehicle system 206 of FIG. 2) corresponding to a presence or absence of fuel vapors released due to leaks in the bellows of the fuel tank (e.g., the bellows 291 of the fuel tank 144 of FIG. 2), where plot 810 shows HC sensor response under a first scenario (e.g., no leak/degradation in bellows), and plot 812 shows HC sensor response under a second scenario (e.g., a leak/degradation in bellows).

Plots 802, 804, 806, 808, 810, and 812 illustrate states of the above mentioned components of the vehicle system across four durations: a first duration from time t0 to time t1; a second duration from time t1 to time t2; a third duration from time t2 to time t3; and a fourth duration from time t3 to time t4.

At time t0, the vehicle engine is in an ON state at plot 802. The fuel level of the fuel tank at plot 804 is above the threshold level 803. The ELCM changeover valve is in an OPEN position at plot 806, and the fuel pump at plot 808 is in an ON position. In one example, the vehicle is being driven with engine ON at time t0. Since the conditions for the active diagnostic test of the fuel system are not met at time t0, no HC sensor response is shown for the scenarios 1 and 2.

Over the first duration from t0 to t1, plot 802 for engine status, plot 806 for ELCM changeover valve, and plot 808 for fuel pump remain unchanged. In contrast, plot 804 shows a fuel level of the fuel tank that decreases over the first duration from t0 to t1, while the vehicle is being driven. The fuel level of the fuel tank goes down from being above the threshold level 803 to being below the threshold level 803, over the first duration from t0 to t1.

At time t1, due to a decrease in torque demand, the vehicle engine is shut-down at plot 802 and the fuel level of the fuel tank at plot 804 is below the threshold level 803 (i.e., below the maximum expansion level of the bellows). Thus, the entry conditions for the active diagnostic test of the fuel system are met at time t1. At time t1, the fuel pump is adjusted to an OFF position at plot 808, while the ELCM changeover valve remains in an OPEN position at plot 806. At time t1, no HC sensor response is detected as shown by plots 810 and 812 for the scenarios 1 and 2, respectively. Additionally, over the second duration from t1 to t2, plots 802, 804, 806, 808, 810, and 812 remain unchanged.

At time t2, the vehicle engine remains in an OFF state at plot 802 and the fuel level of the fuel tank at plot 804 remains below the threshold level 803. To determine whether a degradation condition is present in the bellows of the fuel tank, at t2 the ELCM changeover valve is adjusted to a CLOSED position (as indicated by the plot 806) to isolate canister from the HC sensor. Additionally, the fuel pump is adjusted to an ON state at t2 as indicated by the plot 808 to generate fuel vapors within the fuel tank. As shown, over the third duration from t2 to t3, plots 802, 804, 806, and 808 remain unchanged. At time t2 and over the third duration from t2 to t3, plot 810 shows no HC sensor response, indicating that hydrocarbon content is not detected during the active diagnostic test of the bellows, whereby it may be concluded that no degradations/leaks exist in the bellows of the fuel tank under scenario 1. Alternatively, plot 812 shows an increased HC sensor response at t2 and over the third duration from t2 to t3, indicating entry of fuel vapors into the bellows through a rupture in the bellows and migration of fuel vapors from an atmospheric port (e.g., the atmospheric port 293 of FIG. 2) of the bellows to the HC sensor via a vapor line (e.g., the vapor line 299 of FIG. 2). This leads to a detection of hydrocarbon content by the HC sensor during the active diagnostic test of the bellows. Therefore, under scenario 2 it may be concluded that a degradation/leak condition exists in the bellows of the fuel tank.

After the diagnosis is completed, at time t3, the vehicle engine may remain in an OFF state at plot 802 and the fuel level of the fuel tank at plot 804 may remain below the threshold level 803. Additionally, the ELCM changeover valve may remain in a CLOSED position as indicated by the plot 806. As the diagnostic procedure ends and as a mitigating action, the fuel pump at plot 808 may be adjusted to a CLOSED position at t3 to stop the generation of fuel vapors and excess fuel vapors within the fuel tank may be diverted to canister for adsorption. At time t3, no HC sensor response may be detected as shown by plots 810 and 812 for the scenarios 1 and 2, respectively. Additionally, over the fourth duration from t3 to t4, plots 802, 804, 806, 808, 810, and 812 may remain unchanged.

In this way, systems and methods are provided for detecting degradation of a variable volume device (e.g., bellows) included in a fuel tank of a fuel system. In one example, the bellows may be disposed within the fuel tank and in fluidic communication with a hydrocarbon sensor of the evaporative emissions control system via a vapor line. The bellows may be configured to compress during filling of the fuel tank and expand while fuel is pumped to an engine coupled to the fuel system. As such, a fuel vapor pressure of the fuel tank may be maintained at or near atmospheric pressure when no leaks are present in the bellows. To actively detect leaks in the bellows, excitation of the HC sensor may be monitored after isolating a fuel vapor canister from the HC sensor by adjusting an ELCM changeover valve or a canister vent valve. Performing this method may be conditioned on a level of fuel in the fuel tank being below a maximum expansion level of the bellows. To passively detect leaks in the bellows, excitation of the HC sensor may be monitored during refueling of the fuel system. Performing this method may be conditioned on a fuel level of the fuel tank being above a maximum expansion level of the bellows. A technical effect of the methods and systems provided in the present disclosure includes fulfillment of current and future leak detection regulations in a pressure-less fuel tank with a variable volume device (e.g., bellows). Since bellows are implicated as a source of leak, servicing the bellows accordingly while preserving the fuel tank is important. The systems and the diagnostic routines of the present disclosure assist in identifying leaks in the bellows rapidly and efficiently. Furthermore, a degradation/leak in the bellows is effectively detected (using an existing HC sensor) without installing additional specialized components beyond what is already provided in a vehicle, thereby reducing costs.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
a variable volume device disposed within a fuel tank;
an atmospheric port of the variable volume device fluidly coupled to a vent line upstream of a hydrocarbon sensor coupled to the vent line, the vent line coupling a fuel vapor canister to atmosphere; and
a controller storing instructions for:
monitoring output of the hydrocarbon sensor; and
generating an indication of a degradation in the variable volume device based on the monitored hydrocarbon sensor.

2. The system of claim 1, wherein the hydrocarbon sensor detects fuel vapors escaping from both the fuel vapor canister and the variable volume device.

3. The system of claim 1, further comprising an evaporative level check monitor disposed in the vent line between the fuel vapor canister and the hydrocarbon sensor, the evaporative level check monitor including a changeover valve (COV).

4. The system of claim 3, wherein an adjustment of the changeover valve of the evaporative level check monitor to a closed position isolates the fuel vapor canister from the hydrocarbon sensor.

5. The system of claim 1, wherein the variable volume device is a bellows internally sealed within the fuel tank.

6. The system of claim 1, further comprising, after generating the indication of the degradation, altering one or more vehicle operating conditions to reduce fuel vapor load in the fuel tank during a vehicle on condition,
wherein altering the one or more vehicle operating conditions comprises one or more of:
altering one or more of an engine speed and an engine load; and
entering an electric drive mode of the vehicle.

7. The system of claim 1, wherein the fuel tank is a NIRCOS fuel tank and a level of fuel of the fuel tank is measured via a fuel level sensor.

8. The system of claim 1, wherein the vehicle is a hybrid electric vehicle.

9. A diagnostic method for a vehicle, the method comprising:
monitoring a level of fuel in a fuel tank, the fuel tank including a bellows internal to the fuel tank, an atmospheric port of the bellows coupled to a vent line via a vapor line;
isolating a refueling canister fluidly coupled to the fuel tank from a hydrocarbon sensor positioned in a vent line coupling the refueling canister to atmosphere by closing a changeover valve;
activating a fuel pump positioned in the fuel tank to generate fuel vapors; and
monitoring output of a hydrocarbon sensor coupled to the vent line to identify a degradation in the bellows.

10. The method of claim 9, wherein the method is performed during an engine off condition.

11. The method of claim 9, wherein the level of fuel in the fuel tank is measured via a fuel level sensor disposed within the fuel tank, and performing the method is conditioned on the level of fuel in the fuel tank being below a maximum expansion level of the bellows.

12. The method of claim 9, wherein the changeover valve is a part of an evaporative level check monitor and is arranged in the vent line between the refueling canister and the hydrocarbon sensor, and wherein closing the changeover valve uncouples the refueling canister from atmosphere.

13. The method of claim 9, wherein the degradation in the bellows is identified responsive to a detection of hydrocarbon content by the hydrocarbon sensor, indicating flow of fuel vapors from the atmospheric port of the bellows to the vent line via the vapor line.

14. The method of claim 9, further comprising, after identifying the degradation, displaying a notification to an operator of the vehicle during a vehicle on condition indicating a presence of the degradation.

15. The method of claim 9, further comprising, after identifying the degradation, altering one or more vehicle operating conditions to reduce fuel vapor load in the fuel tank during a vehicle on condition,
   wherein altering the one or more vehicle operating conditions comprises one or more of:
      altering one or more of an engine speed and an engine load; and
      entering an electric drive mode of the vehicle.

16. A method for diagnosing a fuel system of a vehicle, the method comprising:
   during refueling of a fuel tank of the vehicle, monitoring a fuel level of the fuel tank, the fuel tank including a bellows, an atmospheric port of the bellows coupled to a vent line via a vapor line;
   monitoring a hydrocarbon sensor while the fuel level of the fuel tank increases during refueling, wherein the hydrocarbon sensor is positioned in the vent line proximal to an attachment point of the vent line and the vapor line; and
   identifying a degradation in the bellows coupled to the fuel tank based on the monitored hydrocarbon sensor.

17. The method of claim 16, further comprising, prior to the refueling, diagnosing a fuel vapor canister by monitoring the hydrocarbon sensor for hydrocarbon content, wherein the fuel vapor canister is fluidly coupled to the fuel tank and is arranged in the vent line upstream of the hydrocarbon sensor relative to a direction of gas flow.

18. The method of claim 16, wherein the fuel level of the fuel tank is measured via a fuel level sensor disposed within the fuel tank, and wherein the identifying of the degradation in the bellows is carried out during the fuel level in the fuel tank being above a maximum expansion level of the bellows.

19. The method of claim 16, wherein the degradation in the bellows is identified responsive to a detection of hydrocarbon content by the hydrocarbon sensor, indicating entry of fuel into the bellows and flow of fuel vapors from the atmospheric port of the bellows to the vent line via the vapor line.

20. The method of claim 16, further comprising, after identifying the degradation, displaying a notification to an operator of the vehicle during a vehicle on condition indicating a presence of the degradation.

* * * * *